United States Patent [19]
Pappalardo

[11] Patent Number: 5,854,533
[45] Date of Patent: Dec. 29, 1998

[54] FLUORESCENT LAMPS WITH HIGH COLOR-RENDERING AND HIGH BRIGHTNESS

[75] Inventor: Romano G. Pappalardo, Sudbury, Mass.

[73] Assignee: GTE Products Corporation, Danvers, Mass.

[21] Appl. No.: 963,873

[22] Filed: Oct. 19, 1992

[51] Int. Cl.⁶ .................................................... H01J 1/62
[52] U.S. Cl. .......................................... 313/487; 313/485
[58] Field of Search .................................... 313/487, 484, 313/486; 252/309.36, 700, 301.4 R

[56] References Cited

U.S. PATENT DOCUMENTS

| | | | |
|---|---|---|---|
| 3,858,082 | 12/1974 | Thornton, Jr. | 313/487 |
| 3,875,453 | 4/1975 | Thornton, Jr. | 313/487 |
| 3,937,998 | 2/1976 | Verstegen et al. | 313/487 |
| 4,055,781 | 10/1977 | Schreurs et al. | 313/487 |
| 4,231,892 | 11/1980 | Chang et al. | 252/301.6 |
| 4,251,750 | 2/1981 | Galien et al. | 313/487 |
| 4,266,161 | 5/1981 | Kasenga | 313/487 |
| 4,296,353 | 10/1981 | Walter | 313/487 |
| 4,305,019 | 12/1981 | Gragg et al. | 313/487 |
| 4,423,349 | 12/1983 | Nakajima et al. | 313/487 |
| 4,551,397 | 11/1985 | Yaguchi et al. | 428/691 |
| 4,602,188 | 7/1986 | de Hair et al. | 313/487 |
| 4,623,816 | 11/1986 | Hoffman et al. | 313/487 |
| 4,644,223 | 2/1987 | de Hair et al. | 313/485 |
| 4,717,857 | 1/1988 | Wozniak et al. | 313/487 |
| 4,728,459 | 3/1988 | Fan | 252/301.5 |
| 4,797,594 | 1/1989 | Sigai et al. | 313/488 |
| 4,806,824 | 2/1989 | Paynter et al. | 313/486 |
| 4,879,492 | 11/1989 | Latassa et al. | 313/487 |
| 5,003,220 | 3/1991 | Fohl et al. | 313/493 |
| 5,051,277 | 9/1991 | Sigai et al. | 427/69 |
| 5,087,523 | 2/1992 | Klinedinst et al. | 427/69 |
| 5,105,122 | 4/1992 | Konings et al. | 313/487 |
| 5,122,710 | 6/1992 | Northrop et al. | 313/487 |
| 5,196,234 | 3/1993 | Taubner et al. | 313/213 |

*Primary Examiner*—Amare Mengistu

[57] ABSTRACT

A fluorescent lamp comprises a plurality of metameric blends of lamp phosphors for converting ultraviolet radiation to visible illumination.

28 Claims, 27 Drawing Sheets

FLUORESCENT LAMPS WITH HIGH COLOR-RENDERING AND HIGH BRIGHTNESS

TECHNICAL FIELD OF THE INVENTION

This invention relates to fluorescent lamps and fluorescent-lamp phosphors, and specifically to improvements in cost/performance of fluorescent lamps as a result of utilizing appropriate combinations of phosphors.

BACKGROUND OF THE INVENTION

Electrical discharges in a low-pressure noble gas containing mercury generate UV radiation (mainly at 254 nm) with high efficiency. This UV radiation from the mercury/noble-gas plasma can be converted into visible light by appropriate materials (phosphors). The combination of this low-pressure plasma plus the phosphor constitutes a fluorescent lamp (FIG. 1).

For a given low-pressure plasma, the fluorescent-lamp output depends on the phosphor (or phosphor combination) utilized. In the industry the fluorescent-lamp output is specified radiometrically by its Spectral Power Distribution (SPD), namely by the radiant power per wavelength interval over a spectral region (typically from 375 nm to 760 nm) that spans not only the visible region, but also a portion of the near UV spectrum and of the near-infrared spectrum.

Regardless of the phosphor(s) used, the SPD from a fluorescent source is intrinsically different from that of a black-body radiator, such as the sun or an incandescent lamp. The basic reason for this is that the output from a fluorescent lamp will always contain the sharp emission lines produced in the visible by the plasma-excited mercury atoms, and these emission lines are absent in incandescent lamps or in natural (sun) light.

With the introduction of the fluorescent lamps, the need arose in the industry to correlate and compare the output properties of these non-blackbody radiators with those of known white emitters, such as incandescent lamps. The basis of this correlation is the lamp SPD. In effect, by mathematically convoluting the SPD with three spectral-response functions (color-matching functions) associated with the human visual perception, one can mathematically extract from the SPD two quantities (x and y) defined as the "chromaticity coordinates" of the fluorescent lamp. Each pair of chromaticity coordinates defines a point in the so-called color plane. In particular, the SPD's from black-body radiators (incandescent sources) define in the color plane a line called the "planckian locus". All commercial sources for general-illumination purposes are located on, or in the vicinity of, the planckian locus.

A representative spectral convolution involving the SPD will be of the form:

$$\int_a^b SPD(\lambda) \cdot R(\lambda) d\lambda \quad (1)$$

with $R(\lambda)$ one of the spectral-response functions, and with the integration limits being typically a=380 nm and b=760 nm.

Similarly, a convolution of the SPD with one of the aforementioned response functions, the luminous-efficiency function $V_\lambda$, gives the lumen content of the lamp output, which is a measure of the intensity of the visual stimulus produced by the source in a (typical) human observer. These mathematical transformations have been detailed in various publications of the CIE (Commission Internationale de l'Eclairage).

Two sources, such as a fluorescent lamp and an incandescent lamp, can have different SPD's but the same color coordinates; when viewed directly they produce the same visual perception. In such a case the observer visual response is spectrally averaged over the entire SPD of the source, and this averaging is equivalent to the mathematical convolution that produced the color (or chromaticity) coordinates in the first place. Sources with the same color coordinates, but different SPD are defined as being "metameric".

Problems arise when objects are being observed under illumination by metameric SPD's. In such a case the observer perception is no longer produced by a spectral average over the entire SPD, but only over the source SPD as reflected from the object being viewed. In general, the color (and hence the color coordinates) of a given object will appear different, when viewed under illumination by one or the other of the metameric sources (the fluorescent source and the corresponding incandescent source).

Mathematical procedures were prescribed by the CIE in an attempt to quantify these color differences. The procedures again involve operations on the source SPD, which is now convoluted with the reflectance spectra of eight objects, chosen as representative standards of the range of colors normally encountered. Both the fluorescent-lamp SPD and the SPD of a "temperature correlated" blackbody (incandescent) source are convoluted with the eight reflectance spectra of the standards. In general, the eight quantities derived from the convolution with the fluorescent-source SPD will differ from the corresponding set of eight values obtained with the blackbody SPD. These differences lead to a distortion in color perception, or color rendering, associated with the fluorescent source. The CIE prescribes further mathematical processing of these differences, to arrive at a final set of eight color-rendering indices $R_a$ (with a=1, 2, ... 8). In practice the industry relies on an single, overall figure-of-merit for the color rendering, namely the general color-rendering index of CRI, which results from a weighed average of the individual $R_a$. By definition, CRI=100 for a black-body (incandescent) source.

Since the SPD of an incandescent source varies smoothly over the visible spectral region, while that of a fluorescent lamp has sharp discontinuities at the spectral location of the Hg lines, in order to maximize the CRI of a fluorescent source one can state, as a rule-of-thumb, that the output from the fluorescent source must by distributed over the visible spectral region in a fairly uniform fashion. Then the spectral averages over various sections of the visible spectrum will not markedly differ from the analogous spectral averages for an incandescent source. But there are no specific rules on how to perform this optimization of the CRI. In any case the CRI of the fluorescent source will be a very sensitivity function of the spectral profile of the SPD.

In summary, the output from a fluorescent lamp is fully characterized by its SPD. From the latter one can mathematically derive: its color coordinates, which are roughly speaking a measure of the source "whiteness"; the lumen output (brightness); and the source CRI, namely its ability to faithfully reproduce colors. For a fluorescent source with a given color-point, ideally one would like to simultaneously maximize brightness and CRI, but this is intrinsically impossible. In practice, one strives, by the choice of appropriate phosphor combinations (blends), to produce lamps whose output provides simultaneously high values of the CRI and of the lumen output. In the choice of phosphor-blend components considerations of phosphor cost cannot be ignored, since classes of fluorescent-lamp phosphors currently in use incorporate rare-earth elements, which are very expensive.

Since the lamp output-characteristics are completely described by the lamp SPD, the process of optimizing the lumen output/CRI combination by means of phosphor blending can be carried out theoretically at first, without actually having to build lamps, as long as we have available a mathematical technique to construct SPD's that meet some specific performance objectives. The building blocks ("component" SPD's) for this process are here conveniently chosen as the SPD's of lamps containing a single phosphor.

BRIEF SUMMARY OF THE INVENTION

In accordance with the present invention, there is provided a fluorescent lamp comprising a plurality of metameric blends of lamp phosphors for converting ultraviolet radiation to visible illumination.

The present describes a subset of the SPD-optimization process, in the sense of concentrating on the search of total (lamp) SPD's exhibiting high levels of lumen output and high CRI values, in the neighborhood of eighty, for 40 Watt-T12 fluorescent sources with color coordinates of:

$$x=0.387; y=0.391 \tag{2}$$

Such sources approximate the output of an incandescent source at about 4,000K (more exactly at about 3,950K), and are produced by GTE Products Corp. under the trade name of "Lite-White Deluxe" (LWX) lamps. The methodology to be discussed is applicable in all generality to sources whose color point falls on the planckian locus, or in its vicinity, but here only the results for about 4,000K sources will be reported.

DETAILED DESCRIPTION

Figure 1:
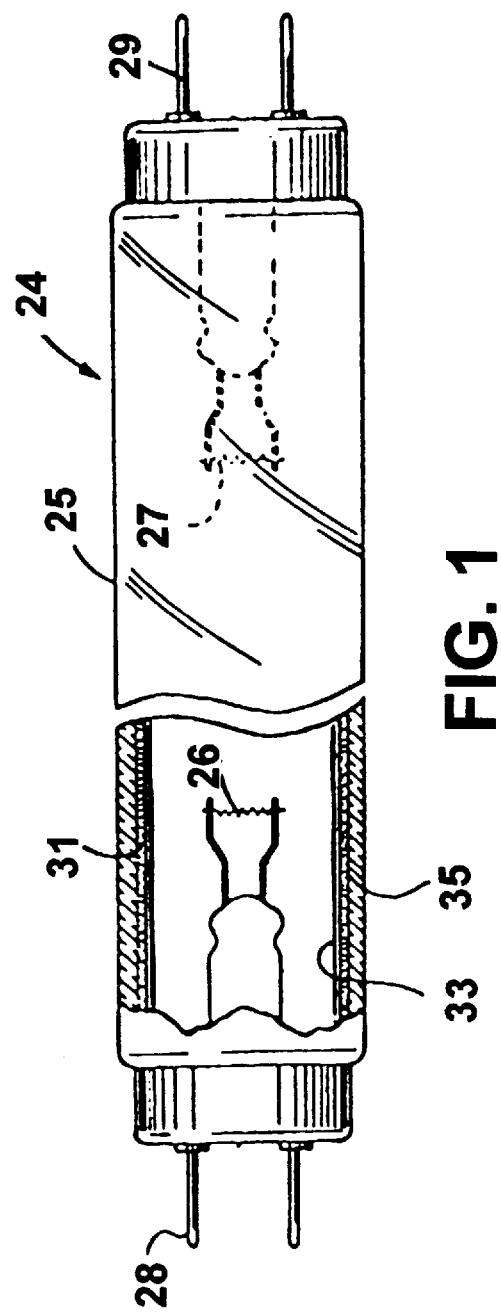
FIG. 1 is perspective view partially broken away of a low pressure mercury discharge fluorescent lamp construction utilizing a dual layer phosphor coating.
Figure 2:
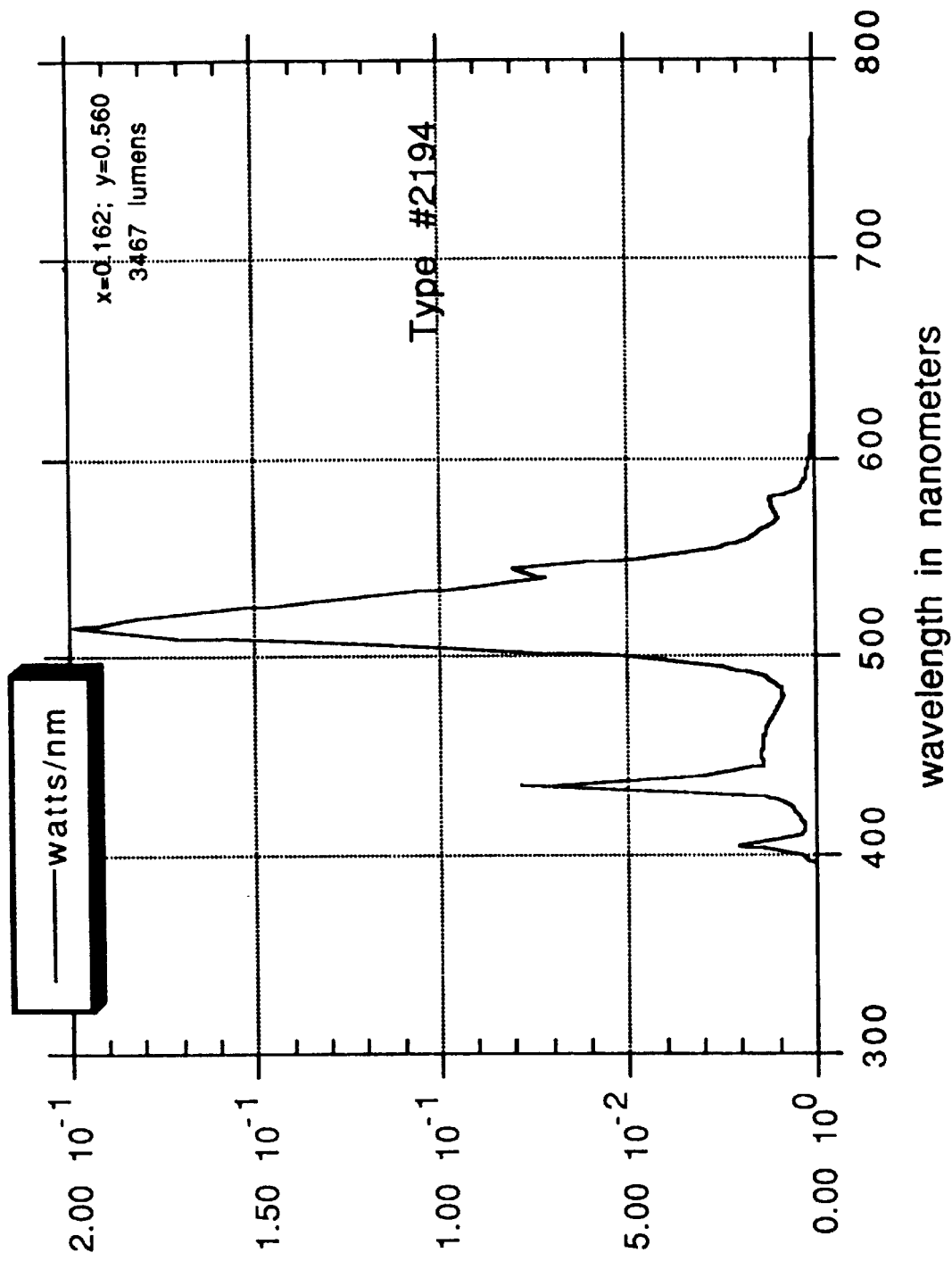
FIG. 2 shows the SPD after 100 hours of operation for a 40 Watt-T12 lamp containing Sylvania phosphor type #2194.
Figure 3:
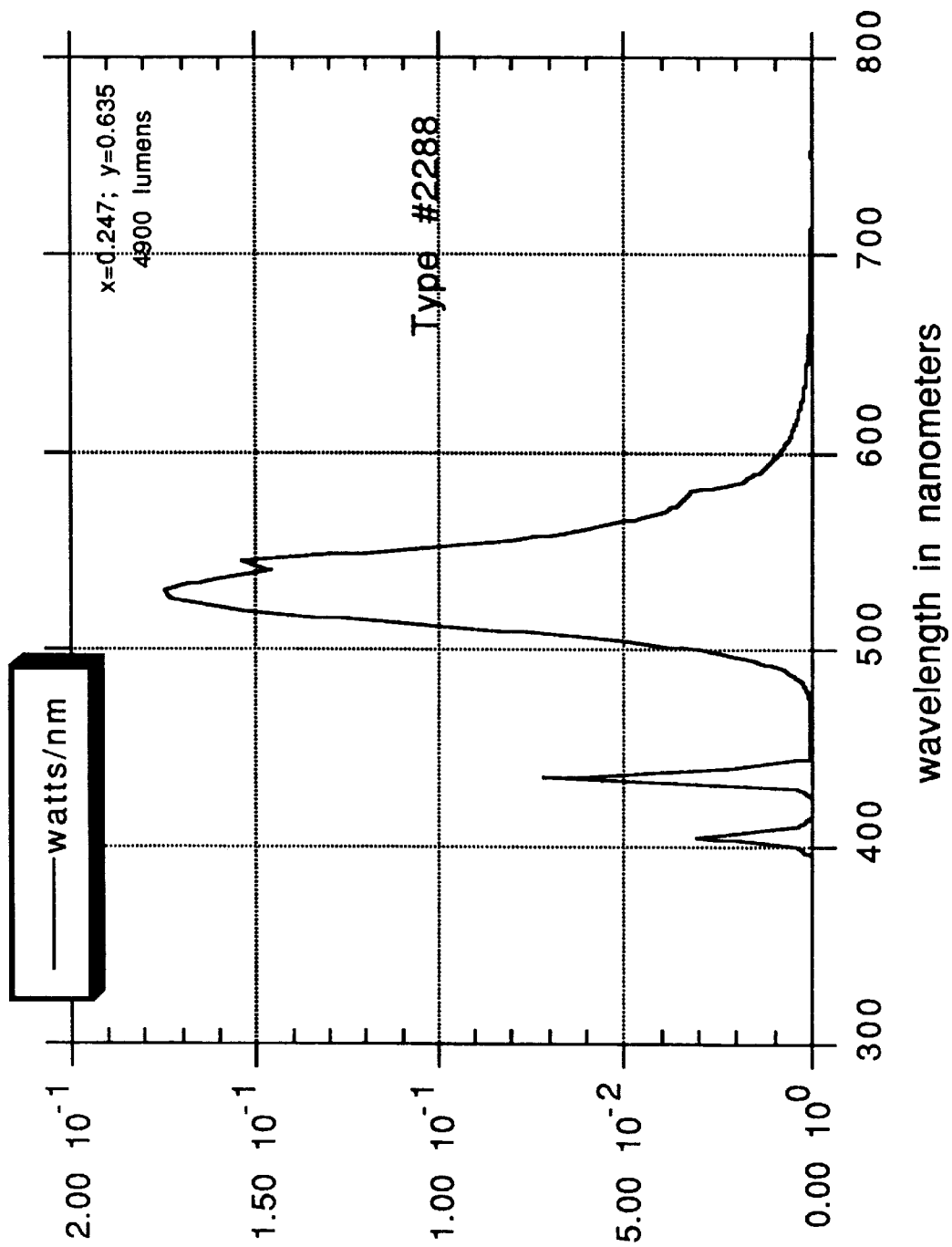
FIG. 3 shows the SPD after 100 hours of operation for a 40 Watt-T12 lamp containing Sylvania phosphor type #2288.
Figure 4:
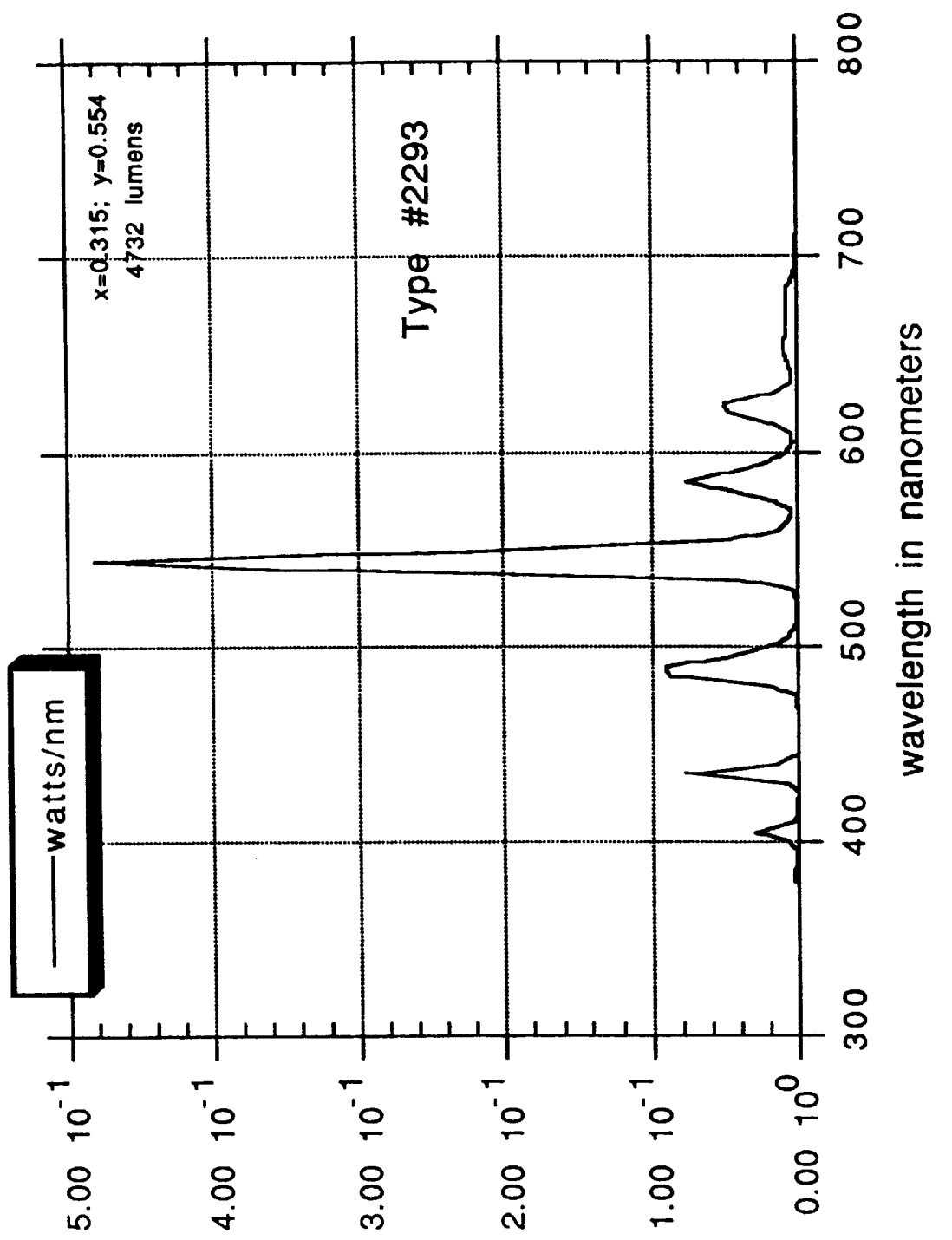
FIG. 4 shows the SPD after 100 hours of operation for a 40 Watt-T12 lamp containing Sylvania phosphor type #2293.
Figure 5:
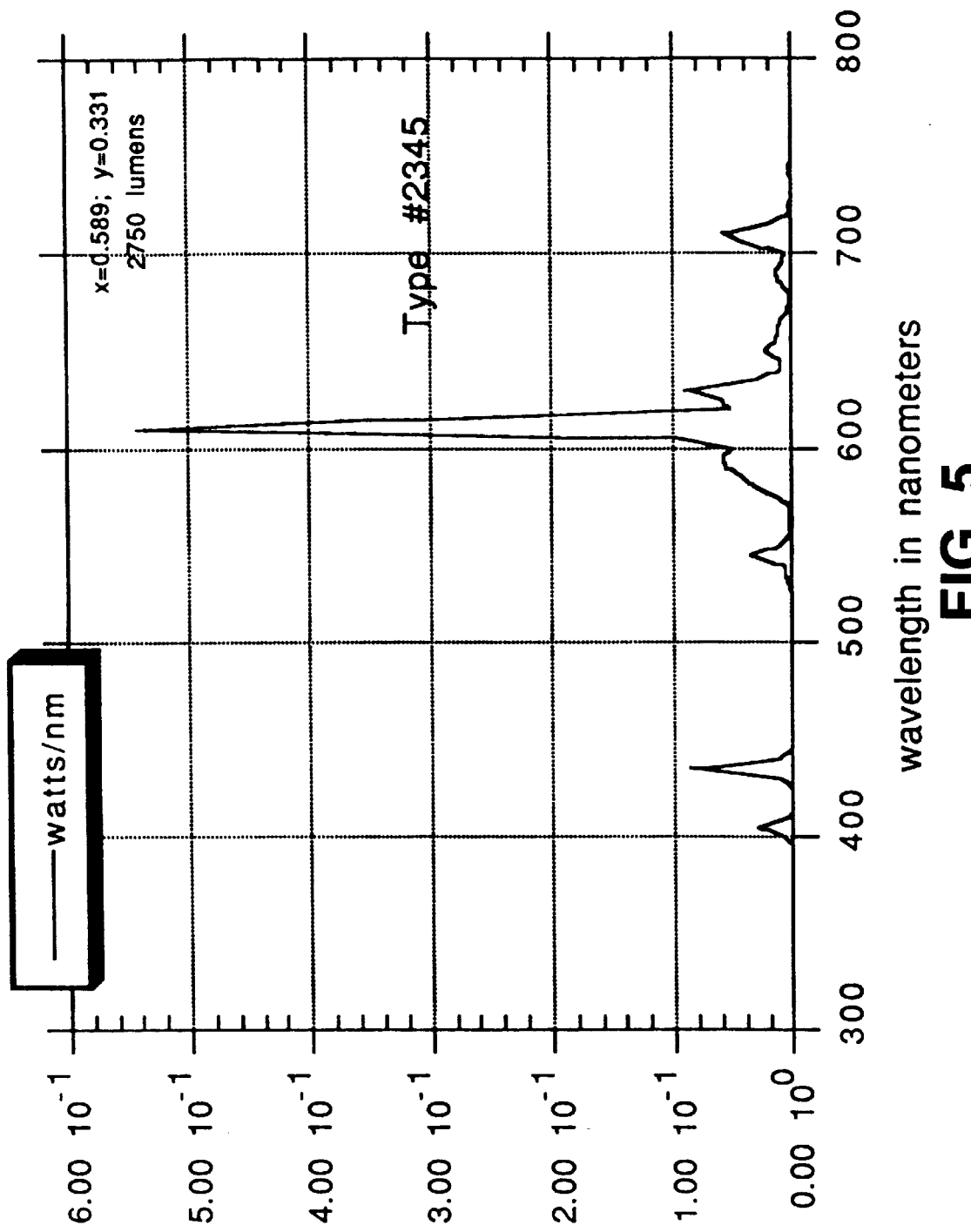
FIG. 5 shows the SPD after 100 hours of operation for a 40 Watt-T12 lamp containing Sylvania phosphor type #2345.
Figure 6:
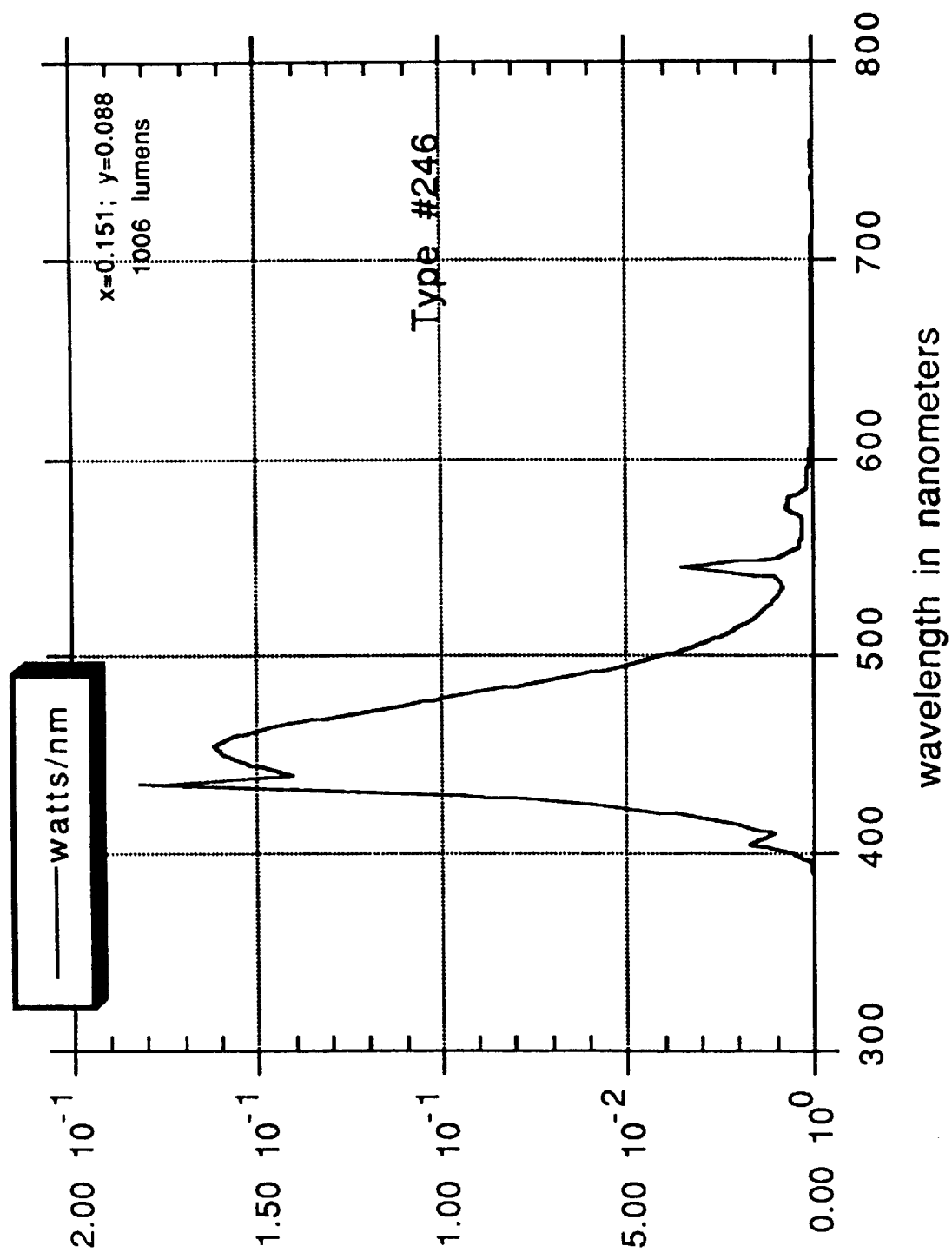
FIG. 6 shows the SPD after 100 hours of operation for 40 Watt-T12 lamp containing Sylvania phosphor type #246.
Figure 7:
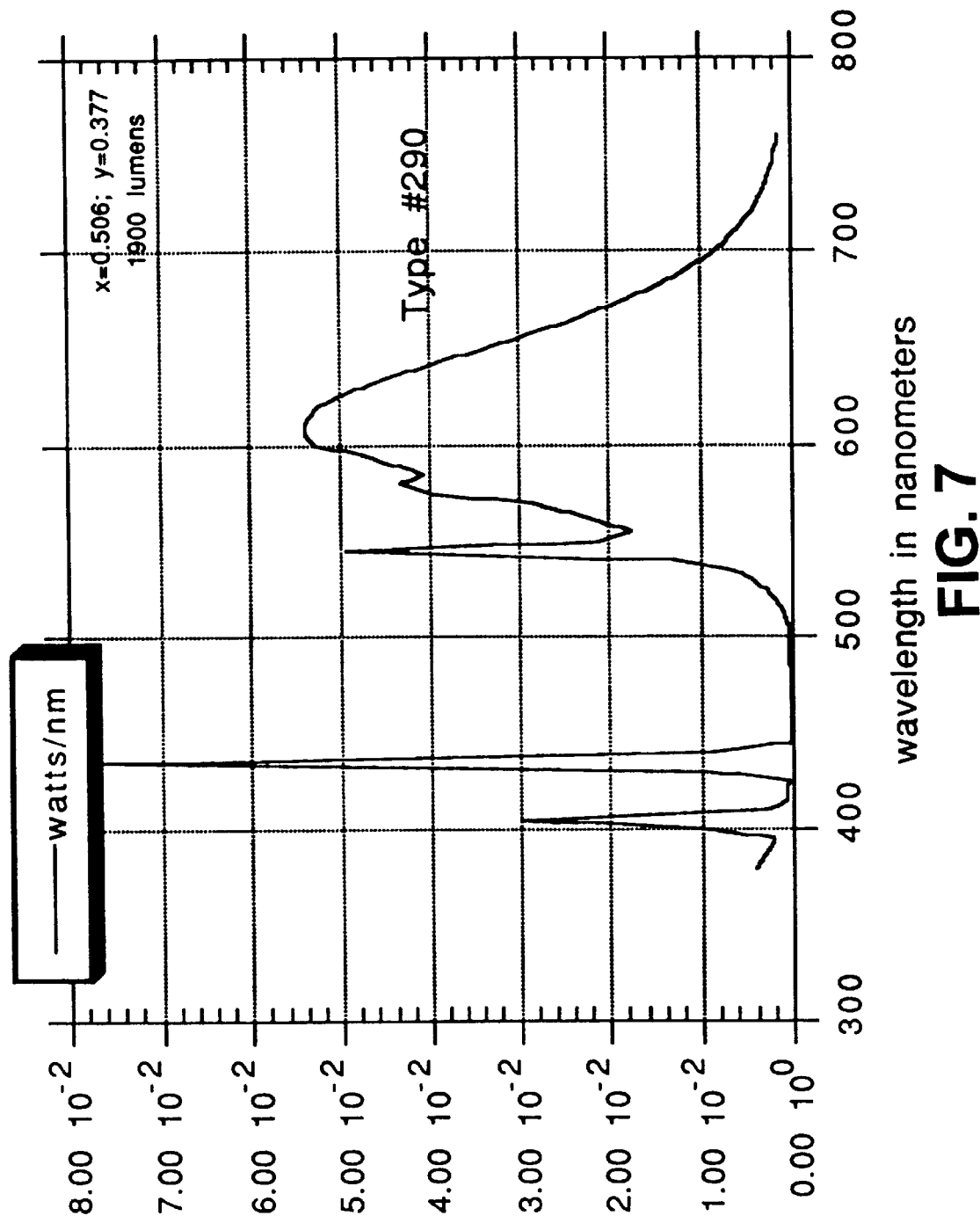
FIG. 7 shows the SPD after 100 hours of operation for a 40 Watt-T12 lamp containing Sylvania phosphor type #290.
Figure 8:
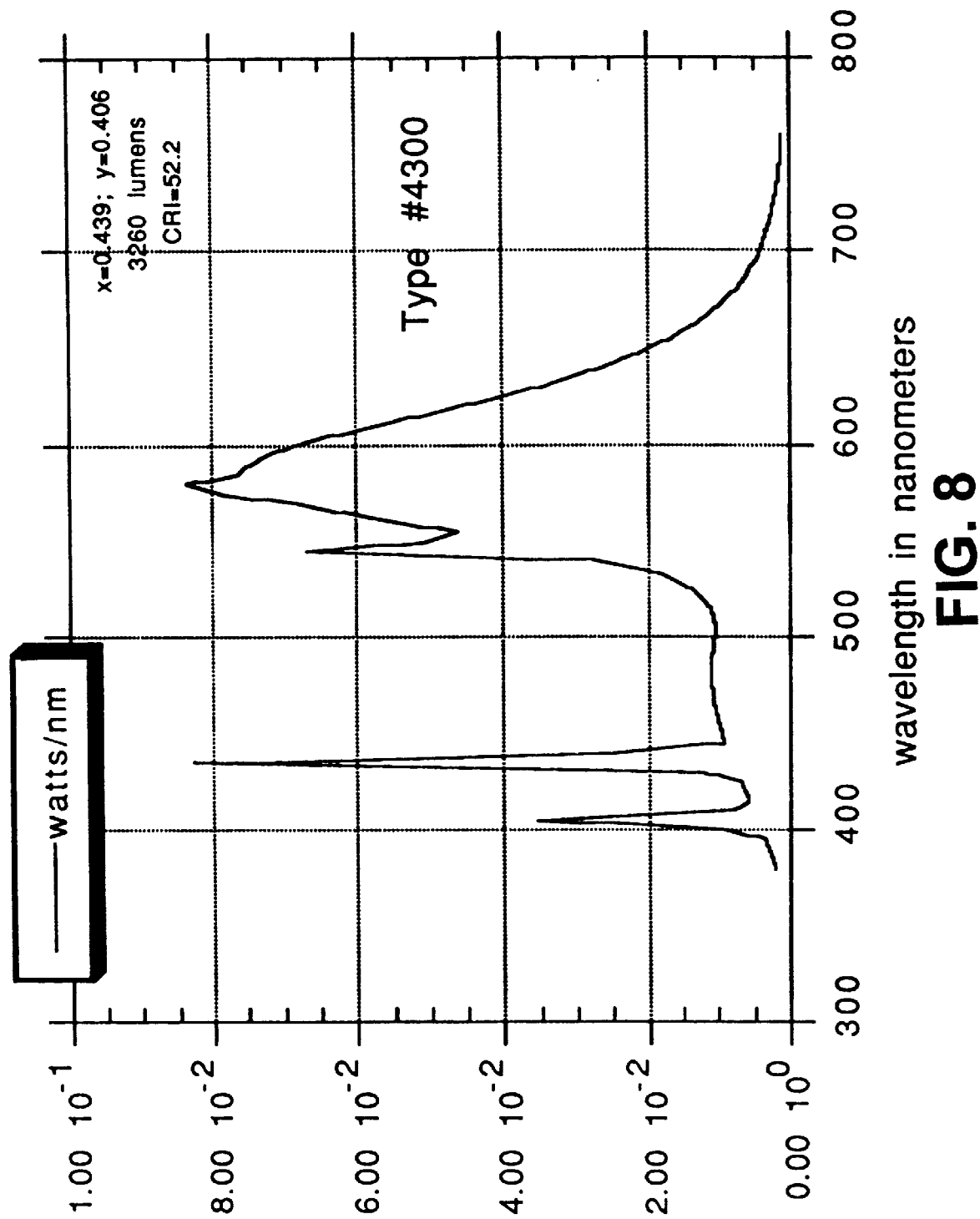
FIG. 8 shows the SPD after 100 hours of operation for a 40 Watt-T12 lamp containing Sylvania phosphor type #4300.
Figure 9:
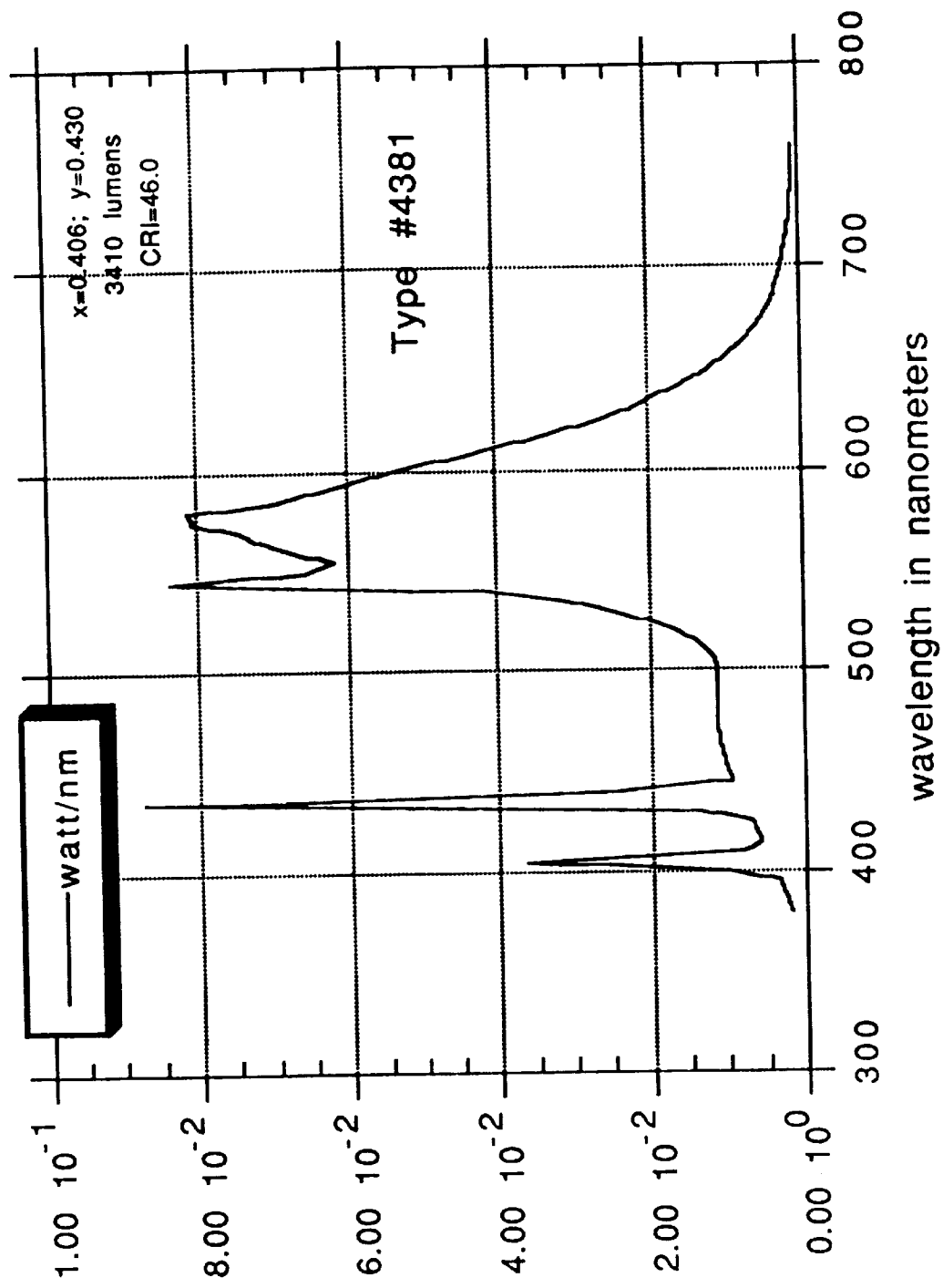
FIG. 9 shows the SPD after 100 hours of operation for a 40 Watt-T12 lamp containing Sylvania phosphor type #4381.
Figure 10:
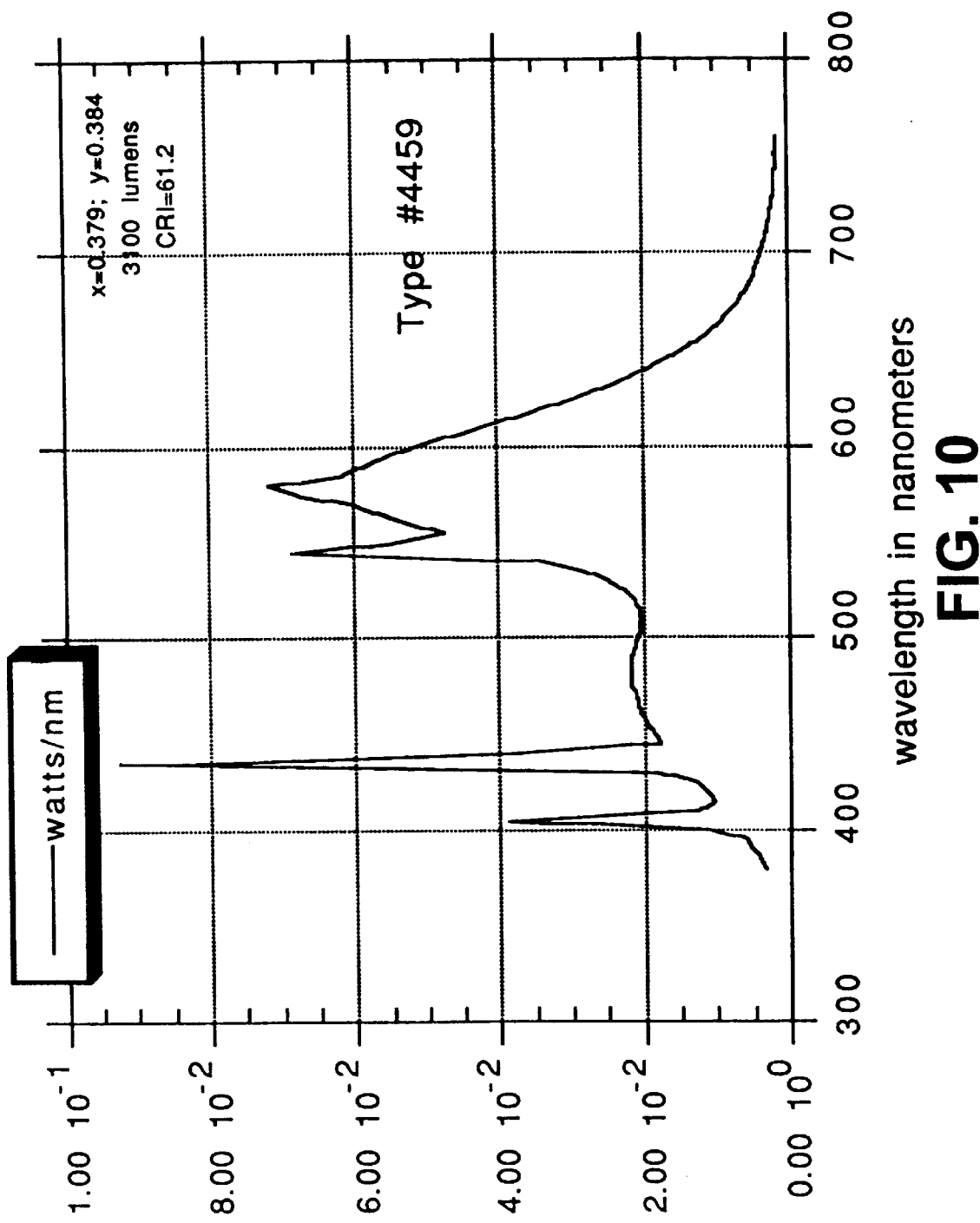
FIG. 10 shows the SPD after 100 hours of operation for a 40 Watt-T12 lamp containing Sylvania phosphor type #4459.

Referring to FIG. 1, there is shown a fluorescent lamp 24 containing a phosphor excitable to fluorescence. The lamp 24 comprises a tubular, hermetically sealed, glass envelope 25. Electrodes 26 and 27 are sealed in the ends of envelope 25. Suitable terminals 28 and 29 are connected to the electrodes 26 and 27 and project from envelope 25. The electrodes 26 and 27 extend through glass presses in mount stems to the terminals 28 and 29.

The interior of the tube is filled with an inert gas such as argon or a mixture of argon and krypton at a low pressure, for example 2 torr, and a small quantity of mercury, at least enough to provide a low vapor pressure during operation. An arc generating and sustaining medium such as one or more inert gases and mercury is included within envelope 25 so that ultraviolet radiation is produced in the interior of the glass envelope during lamp operation. A phosphor coating 31 on the interior surface of the glass envelope converts the emitted ultraviolet radiation to visible illumination having a white color.

In accordance with the principles of the present invention, an improved phosphor layer of the present invention which is illustrated at 33 comprises a plurality of metameric blends of lamp phosphors for converting ultraviolet radiation to visible illumination. Although dual layers of metameric phosphor blends are shown in FIG. 1, a single layer comprising a mixture of metameric phosphor blends may be utilized as a single coat.

When a dual layer is utilized as shown in FIG. 1, the first layer 35 is deposited on the inner glass surface and a second phosphor layer or top layer 33 is deposited on the first phosphor layer 35. The use of a dual phosphor layer permits the weight of phosphor utilized in the second or top coat to be reduced and a less expensive phosphor to be utilized as the first layer 35. The first layer 35 preferably comprises a finely divided metameric blend of fluorescent calcium haloapatite phosphor exhibiting the desired white color point. The second layer or top layer 33 comprises a metameric quad phosphor blend on the inside of the tube so that a substantial portion of the ultraviolet radiation is converted to visible illumination having a white color. The amount of the metameric quad-phosphor blend applied is generally between about 10 percent and 50 percent of the total combined phosphor weight of the total of the metameric quad-blend and the metameric halophosphor.

METHODOLOGY

The derivation to be detailed next goes through the following stages.

First, various combinations of four primary (component) SPD's are systematically explored to identify total (lamp) SPD's exhibiting a target color-point and the required levels of CRI and lumen output.

Second, it is shown how the CRI values can be raised by combining two metameric blend-SPD's with the same target color-point, but individually exhibiting a relatively-low CRI.

Third, guidelines for implementation in actual lamps are described.

Fourth, examples of reduction to practice are reported.

1. SPD of four-component (quad) blends. The main focus of the present treatment is on the results of combining four SPD's, or equivalently, on blending four phosphors. There is a compelling reason for considering four-component blends. When three component SPD's are combined to obtain a total SPD with a pre-assigned target color-point, namely $$SPD_{(tot)} = \Sigma i\ c_i \cdot (SPD)_i \quad (3)$$

with $c_i$=1,2,3, and $$\Sigma i\ c_i = 1 \quad (4)$$

either no solution is possible, or there is a unique solution for the $c_1$, $c_2$, and $c_3$ mixing coefficients. This produces one single value for the CRI and for the lumen output from the blend. The solution exists whenever the target color-point is contained within the triangle formed by the color-points of the three blend components.

As a concrete example, suppose a halophosphate blend with the color point of eq. 2, is required. Such a blend can be obtained for instance by combining the SPD's of the halophosphate phosphor types #4381, #4459, and #4300 listed on TABLES 1 and 2. The resulting SPD of the LWX halo-blend will be produced by the combination:

| | | | |
|---|---|---|---|
| 0.120 · SPD (#4381) | +0.796 · SPD (#4459) | +0.084 · SPD (#4300) | (5) | where by SPD (#4381) we mean the 100 hrs-SPD pertaining to a (performance optimized) 40 Watt-T12 lamp containing only phosphor #4381, and so forth for SPD (#4459) and SPD (#4300). The $c_i$ mixing coefficients of eq. 3 therefore assume the values: 0.120; 0.796; and 0.084, respectively.

On the other hand, if four primary SPD's are combined (four-component phosphor blend) and infinity of solutions satisfy eqs (3) and (4), with as many sets of $c_1$, $c_2$, $c_3$ and $c_4$ mixing coefficients. To each solution there will correspond a pair of values for the CRI and the lumens, and so an infinite set of CRI and lumen values is accessible for selection.

The detailed composition of this infinite set of four-component (quad) blends can be sampled by a process of mathematical induction, starting from the mixing of binary blends with ternary blends. Proprietary computer software was developed to systematically explore the range of existing solutions ($c_i$ mixing coefficients) and to sequentially derive the lumen content and CRI of the various $SPD_{(tot)}$ of eq. 3.

In this application we are not mainly concerned with the details of the mathematical derivation, but rather with the actual SPD's obtained, on the basis of the "primary" or "component" SPD's of lamps containing the phosphors listed in TABLE 1. A summary listing of the relevant phosphor emission-color, powder weight in lamps, and output characteristics at 100 hours of operation is given in TABLE 2 for 40 Watt-T12 lamps containing a single phosphor. The actual SPD's are shown in detail in FIGS. 2 to 11. In turn, the SPD of the LWX halo-blend as derived from eq. 5 is given in FIG. 12.

TABLE 1

Approximate chemical composition of Sylvania phosphors considered in the present application

| Phosphor type (Sylvania ™) | Composition |
|---|---|
| #2194 | BaMgAluminate:Eu;Mn |
| #2288 | Zinc ortho-silicate:Mn |
| #2293 | (Ce,Tb)Mg Hexa-aluminate |
| #2345 | Yttrium Oxide:Eu |
| #246 | BaMg Aluminate:Eu |
| #290 | Ca Silicate:Pb;Mn |
| #4300 | Ca apatite:Sb;Mn (halo-phosphate) |
| #4381 | Ca fluoroapatite:Sb;Mn (halo-phosphate) |
| #4459 | Ca apatite:Sb;Mn (halo-phosphate) |
| (L935)* | Gd pentaborate:Ce;Mn |

*not an actual Sylvania phosphor, but "ad-hoc" designation for a specific lamp-SPD

TABLE 2

Composition, powder weight, and output characteristics
(at 100 hours of operation)
of single-component W40-T12 lamps utilized in the derivation.

| Phos. type (Sylvania) | Emiss. color | Rare-earth* | weight (grams) | lumen at 100 hrs | color coordinates x | y |
|---|---|---|---|---|---|---|
| #246 | blue | yes | 5.2 | 1,006 | 0.151 | 0.088 |
| #2194 | green | yes | 5.9 | 3,467 | 0.162 | 0.560 |
| #2288 | green | no | 6.0 | 4,900 | 0.247 | 0.635 |
| #2293 | green | yes | 6.6 | 4,732 | 0.315 | 0.554 |
| #290 | red | no | 3.1 | 1,900 | 0.589 | 0.331 |
| #2345 | red | yes | 6.1 | 2,750 | 0.506 | 0.377 |
| #4300 | white | no | 7.6 | 3,260 | 0.440 | 0.406 |
| #4381 | yellow | no | 6.3 | 3,410 | 0.406 | 0.430 |
| #4459 | white | no | 6.3 | 3,100 | 0.379 | 0.384 |
| (L93S) | red | yes | n/a | 1,795 | 0.526 | 0.309 |

*The presence of rare-earth elements in a phosphor typically makes it 50 times more expensive than such halophosphate phosphors as #4300, #4381, and #4459.

RESULTS

Although quad blends can be obtained by taking all possible combination of existing lamp phosphors, only five such combinations of four phosphors will be described here, namely:

1. The addition of phosphor #2194 (see TABLES 1 and 2 to a typical "tri-color" blend (i.e., phosphors #246, #2293, #2345) currently used in the industry for high-CRI, high-efficacy fluorescent lamps.
2. Same as above, but with #2293 replaced by #2288 (see TABLES 1 and 2).
3. Phosphors #246 and #2288, plus the two red-emitting phosphors #2345 (line emitter) and #290 (band emitter). See TABLES 1 and 2.
4. Phosphor #246, the two green-emitting phosphors #2194 and #2288, and red-emitting Gd pentaborate: Ce;Mn (see TABLES 1 and 2).
5. Blue-emitting #246, green-emitting #2194, and the two red-emitters #2345 and #290.

In all five cases listed above, after determining the output characteristics of the quad blends, the metameric mixing of the quad blends with LWX halo-blend of eq. 5 was also explored.

Since two metameric SPD's combine to produce a total SPD with the same color point, metameric SPD's can be mixed in any arbitrary proportion, and still maintain some pre-assigned color coordinates. In what follows "metameric mixing" will mean specifically the admixing of a LWX quad-blend with the LWX halo-blend of eq. 5.

In view of the low cost of the halophosphate phosphors, economic advantages will always result from this "metameric mixing". Furthermore, in the most favorable cases the CRI, brightness and cost of the final LWX-mix will all be improved by the addition of the halophosphate phosphors.

1. Blends of #246; #2194; #2293; #2345.

A representative sampling of the infinite set of possible formulations, with the respective values of lumen output and CRI, are listed in TABLE 3. The entries in the columns labelled by the phosphor types correspond to the mixing coefficient $c_i$ of eqs. 3 and 4. The output characteristics are also plotted in FIG. 13 as a function of the fractional content in #2194.

Figure 13:
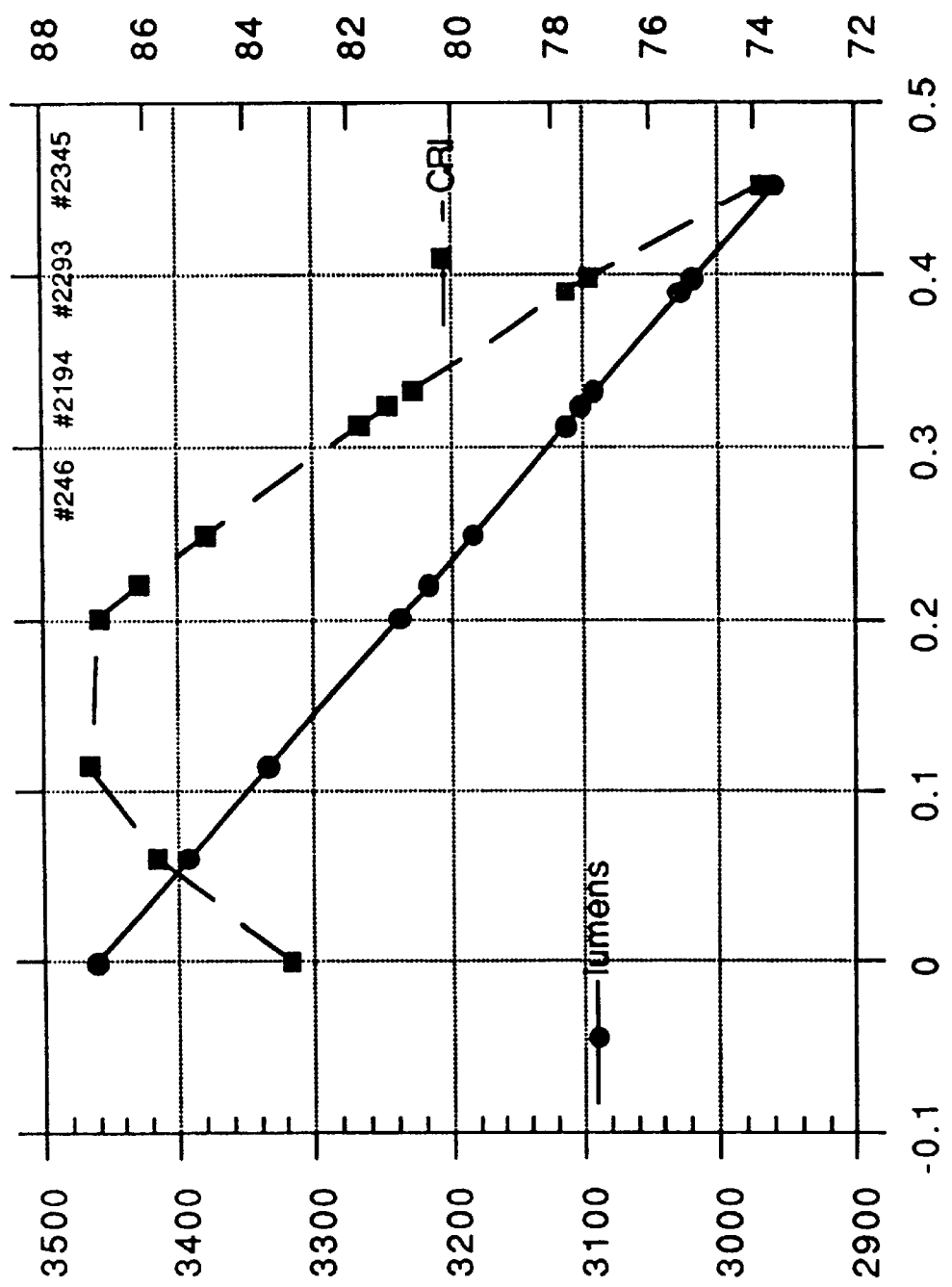
FIG. 13 shows lumen and CRI characteristics of quad blend containing phosphor types #246, #2194, #2293, and #2345 as a function of the fractional content in the #2194 phosphor. Blends for the LWX color point (x=0.387; y=0.391).
Figure 14:
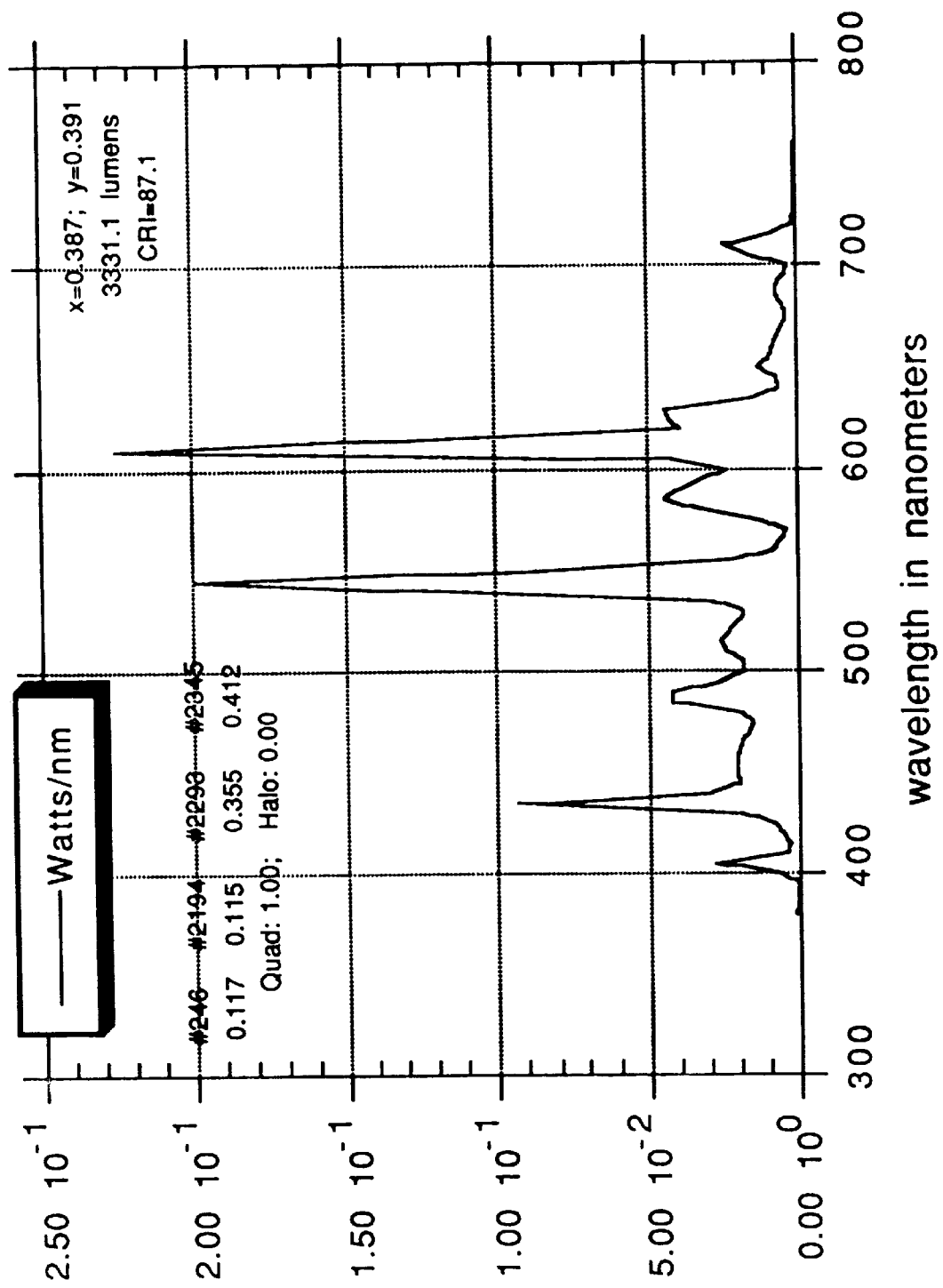
FIG. 14 shows the SPD for a quad blend for the LWX color point and containing phosphors #246, #2194, #2293, and #2345. Mixing coefficients and output characteristics are also indicated. No halo addition.

From inspection of TABLE 3 and FIG. 13 it can be concluded that the addition of #2194 to the tri-color blend of #246, #2293, and #2345 (first row of TABLE 3 and leftmost data points in FIG. 13 produces a broad increase in the CRI, to a peak value of ~87.1 for 0.115.SPD(#2194). The SPD of this blend is shown in FIG. 14.

The CRI of the quad blend exceeds that of the original tri-blend for #2194 fractions ranging from 0 to ~0.30 (FIG. 13 and TABLE 3). Then the CRI drops as the #2194 content is further raised beyond ~0.30. Conversely, the quad-blend lumen output drops linearly as the #2194 content increases (FIG. 13).

Moving next to metameric mixes, quite generally the changes in CRI resulting from the admixing of the LWX halo-blend depend on the specific #2194 content in the quad blend.

Figure 15:
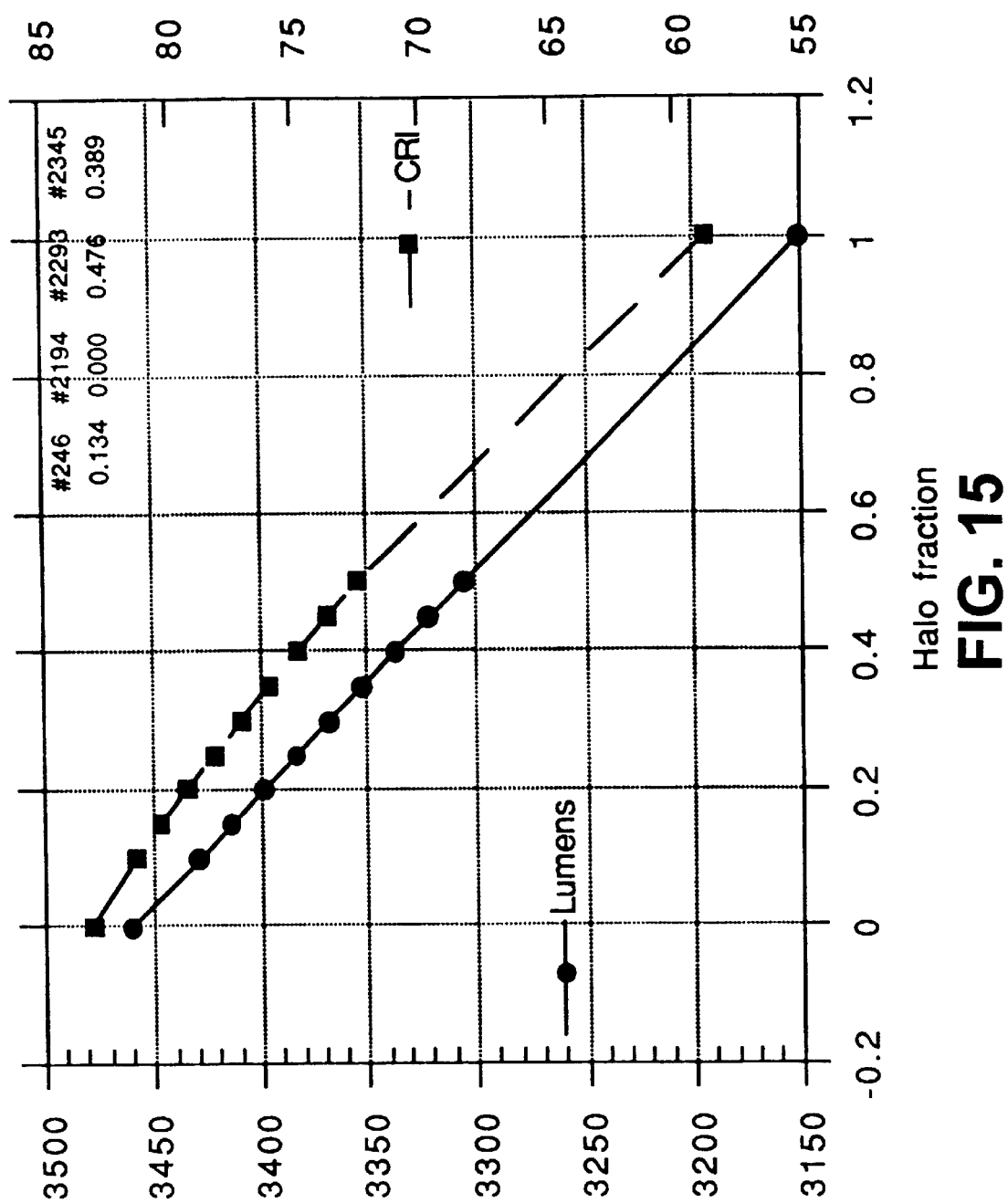
FIG. 15 shows the effect of metameric mixing on the CRI and lumen output for a tri-blend for the LWX color point, and based on phosphors #246, #2293, and #2345, according to the $c_i$ mixing coefficients listed in the Figure.

When the #2194 content is zero (first row in TABLE 3) the quad blend reduces to a tri-phosphor blend of the type currently employed in the industry. In this case the effect of metameric mixing with the LWX halo-blend of eq. 5 is summarized in TABLE 4 and FIG. 15, where the LWX halo-blend is added in 5% increments, starting at the 10% level, up to a value of 50%.

As the LWX halo-blend is added to the tri-component blend, both the CRI and the lumen output drop monotonically (FIG. 15), the latter in a linear fashion, the former in a shallow, parabolic fashion, down to the limiting value of CRI=58.8, which is the CRI for the LWX halo-blend alone (TABLE 4). The only motivation for adding the LWX halo-blend then would be to capitalize on its lower cost, even if lumens and CRI have to be sacrificed, compared to the starting tri-component blend.

TABLE 3

Quad blends for the LWX color-point (x = 0.387 and y = 0.391),
based on phosphors #246, #2194, #2293, and #2345.
Composition and predicted output in order of increasing #2194

Quad-blend content as fractional SPD(#XXXX)

| #246 | #2194 | #2293 | #2345 | Lumens | CRI |
|---|---|---|---|---|---|
| 0.134 | 0.000 | 0.476 | 0.389 | 3460.3 | 83.13 |
| 0.125 | 0.061 | 0.411 | 0.401 | 3392.0 | 85.74 |
| 0.117 | 0.115 | 0.355 | 0.412 | 3333.1 | 87.09 |
| 0.104 | 0.201 | 0.264 | 0.430 | 3237.1 | 86.89 |
| 0.101 | 0.220 | 0.244 | 0.433 | 3216.2 | 86.11 |
| 0.097 | 0.250 | 0.213 | 0.434 | 3182.7 | 84.76 |
| 0.087 | 0.313 | 0.146 | 0.452 | 3112.0 | 81.76 |
| 0.085 | 0.324 | 0.135 | 0.455 | 3100.8 | 81.22 |
| 0.084 | 0.333 | 0.125 | 0.456 | 3091.0 | 80.77 |
| 0.075 | 0.390 | 0.065 | 0.468 | 3027.0 | 77.67 |
| 0.074 | 0.398 | 0.056 | 0.470 | 3017.9 | 77.21 |
| 0.066 | 0.452 | 0.000 | 0.481 | 2958.3 | 73.82 |

TABLE 4

Effect of adding the LWX halo-blend to LWX quad-blends.
QUAD blend: 0.134 (#246); 0.000 (#2194); 0.476 (#2293); 0.389 (#2345)
LWX halo-blend: 0.120 (#4381); 0.796 (#4459); 0.084 (#4300).

| Halo fraction | Quad fraction | Lumens | CRI |
|---|---|---|---|
| 0.00 | 1.00 | 3460.3 | 83.13 |
| 0.10 | 0.90 | 3429.4 | 81.45 |
| 0.15 | 0.85 | 3413.9 | 80.47 |
| 0.20 | 0.80 | 3398.4 | 79.43 |
| 0.25 | 0.75 | 3382.9 | 78.35 |
| 0.30 | 0.70 | 3367.4 | 77.24 |
| 0.35 | 0.65 | 3351.9 | 76.10 |
| 0.40 | 0.60 | 3336.5 | 74.93 |

TABLE 4-continued

Effect of adding the LWX halo-blend to LWX quad-blends.
QUAD blend: 0.134 (#246); 0.000 (#2194); 0.476 (#2293); 0.389 (#2345)
LWX halo-blend: 0.120 (#4381); 0.796 (#4459); 0.084 (#4300).

| Halo fraction | Quad fraction | Lumens | CRI |
|---|---|---|---|
| 0.45 | 0.55 | 3321.0 | 73.74 |
| 0.50 | 0.50 | 3305.0 | 72.52 |
| 1.00 | 0.00 | 3150.6 | 58.83 |

Figure 16:
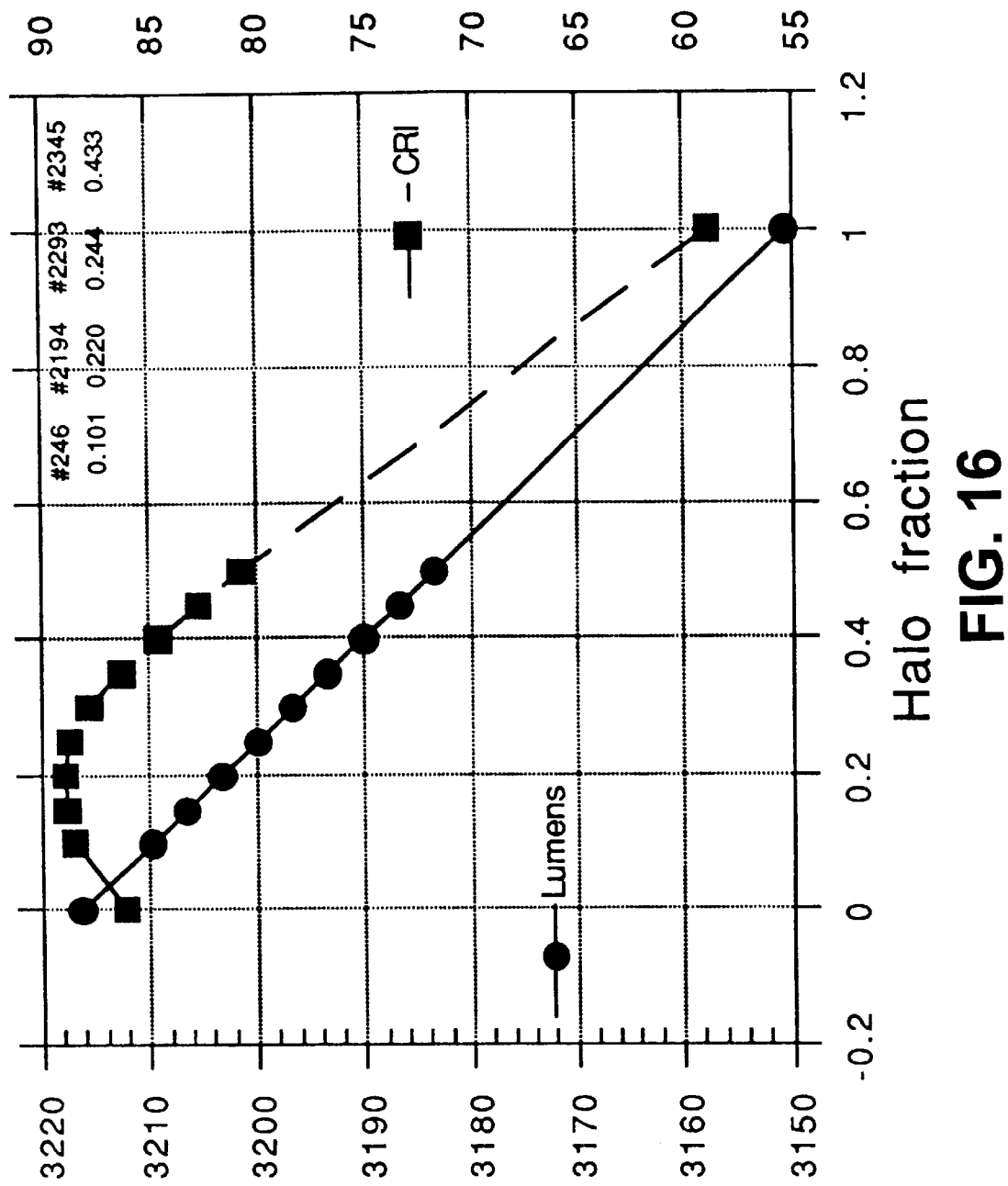
FIG. 16 shows the increase in CRI and lumen output resulting from metameric mixing for a specific LWX quad-blend based on phosphors #246, #2194, #2293, and #2345, according to the $c_i$ mixing coefficients listed in the Figure.

A similar trend is observed in the metameric mixing of the quad blend containing 0.061. SPD(#2194), and whose composition is given in the second row of TABLE 3. The halo addition (TABLE 5) improves neither the lumen output nor the CRI of the starting quad-blend. As the #2194 content increases, though, the halo addition is definitely beneficial. This is shown in FIG. 16 and TABLE 6 for a blend containing 0.220.SPD(#2194). A peak CRI value of ~89 (TABLE 6) is predicted at a 20% admix of the LWX halo-blend. The lumen loss caused by the halo addition is minimal, only ~13 lumens, that is about one-third of a percent.

Figure 17:
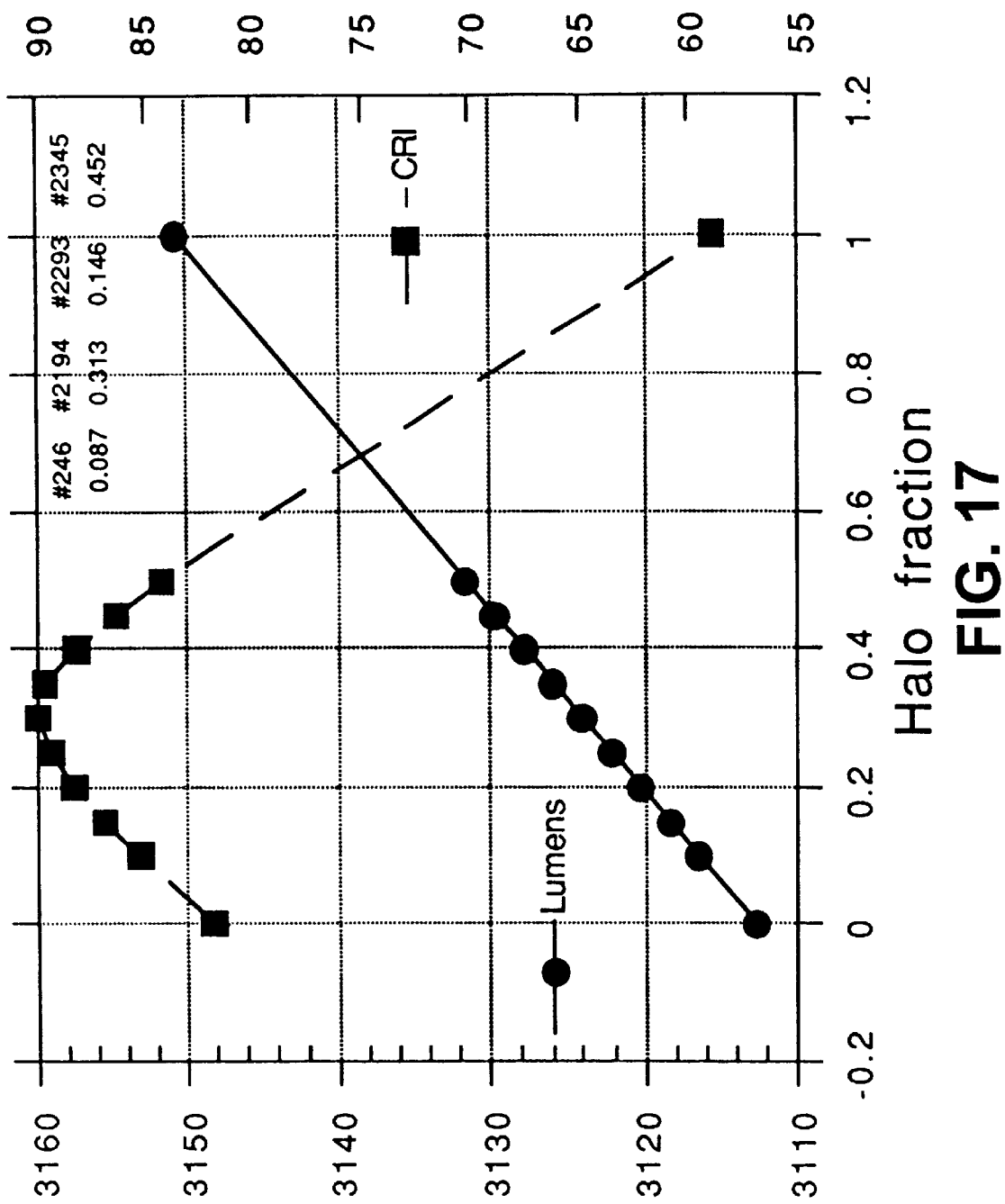
FIG. 17 shows the increase in CRI and lumen output resulting from metameric mixing for a specific LWX quad-blend based on phosphors #246, #2194, #2293, and #2345, according to the $c_i$ mixing coefficients listed in the Figure. The CRI reaches the value of 90 at 30% halo admixing.

It was already mentioned that, as #2194 replaces the more expensive #2293 phosphor, the blend brightness progressively drops (TABLE 3). When the quad blend reaches a lower brightness than that of the halo-blend, the metameric mixing is instrumental in increasing both brightness and CRI. This is shown in TABLE 7 and in FIG. 17 for the quad blend with 0.313 fractional content in #2194. The lumen output increases linearly with the halo-blend content, while the CRI reaches a peak value of ~90 at a 30–35% halo admix.

The metameric mixing was investigated for all the quad blends of TABLE 3. For the sake of brevity, rather than reproducing for all the blends of TABLE 3 the detailed results of the metameric mixing, as shown in detail in TABLES 4 to 7, we shall explicitly list in TABLE 8 only those metameric mixes with maximum values of the CRI. Therefore, TABLE 8 is to be viewed as an expanded version of TABLE 3. When the metameric mixing increases the CRI of the corresponding quad blend, the halo fraction that produces the highest CRI value is listed below the corresponding quad blend. Values of the CRI in the neighborhood of 90 at lumen levels exceeding 3,000 lumens are achievable with most of the metameric mixes. This is important in countries where the building codes require CRI values of 90 for office buildings.

TABLE 5

Effect of adding the LWX halo-blend to LWX quad-blends.
QUAD blend: 0.125 (#246); 0.61 (#2194); 0.411 (#2293); 0.401 (#2345)
LWX halo-blend: 0.120 (#4381); 0.796 (#4459); 0.084 (#4300).

| Halo fraction | Quad fraction | Lumens | CRI |
|---|---|---|---|
| 0.00 | 1.00 | 3392.0 | 85.74 |
| 0.10 | 0.90 | 3367.9 | 84.98 |
| 0.15 | 0.85 | 3355.8 | 84.01 |
| 0.20 | 0.80 | 3343.7 | 82.86 |
| 0.25 | 0.75 | 3331.7 | 81.63 |
| 0.30 | 0.70 | 3319.6 | 80.34 |
| 0.35 | 0.65 | 3307.5 | 79.00 |
| 0.40 | 0.60 | 3295.5 | 77.62 |
| 0.45 | 0.55 | 3283.4 | 76.21 |
| 0.50 | 0.50 | 3271.3 | 74.77 |
| 1.00 | 0.00 | 3150.6 | 58.83 |

TABLE 6

Effect of adding the LWX halo-blend to LWX quad-blends.
QUAD blend: 0.101 (#246); 0.220 (#2194); 0.244 (#2293); 0.433 (#2345)
LWX halo-blend: 0.120 (#4381); 0.796 (#4459); 0.084 (#4300).

| Halo fraction | Quad fraction | Lumens | CRI |
|---|---|---|---|
| 0.00 | 1.00 | 3216.2 | 86.11 |
| 0.10 | 0.90 | 3209.7 | 88.47 |
| 0.15 | 0.85 | 3206.4 | 88.84 |
| 0.20 | 0.80 | 3203.1 | 88.92 |
| 0.25 | 0.75 | 3199.8 | 88.68 |
| 0.30 | 0.70 | 3196.6 | 87.78 |
| 0.35 | 0.65 | 3193.3 | 86.28 |
| 0.40 | 0.60 | 3190.0 | 84.55 |
| 0.45 | 0.55 | 3186.7 | 82.67 |
| 0.50 | 0.50 | 3183.4 | 80.69 |
| 1.00 | 0.00 | 3150.6 | 58.83 |

TABLE 7

Effect of adding the LWX halo-blend to LWX quad-blends.
QUAD blend: 0.087 (#246); 0.313 (#2194); 0.146 (#2293); 0.452 (#2345)
LWX halo-blend: 0.120 (#4381); 0.796 (#4459); 0.084 (#4300).

| Halo fraction | Quad fraction | Lumens | CRI |
|---|---|---|---|
| 0.00 | 1.00 | 3112.6 | 81.76 |
| 0.10 | 0.90 | 3116.4 | 85.23 |
| 0.15 | 0.85 | 3118.3 | 86.84 |
| 0.20 | 0.80 | 3120.2 | 88.31 |
| 0.25 | 0.75 | 3122.1 | 89.37 |
| 0.30 | 0.70 | 3124.0 | 89.97 |
| 0.35 | 0.65 | 3125.9 | 89.65 |
| 0.40 | 0.60 | 3127.8 | 88.20 |
| 0.45 | 0.55 | 3129.7 | 86.32 |
| 0.50 | 0.50 | 3131.6 | 84.17 |
| 1.00 | 0.00 | 3150.6 | 58.83 |

TABLE 8

Maximum CRI obtainable from metameric mixes of quad blends based on #246, #2194, #2293, and #2345.
Comparison with no halo addition. Quad blends listed in order of increasing #2194 content. LWX color point.

| Quad-blend content as fractional SPD(#XXXX) | | | | Halo | | |
|---|---|---|---|---|---|---|
| #246 | #2194 | #2293 | #2345 | fract. | Lumens | CRI |
| Part 1. | | | | | | |
| 0.134 | 0.000 | 0.476 | 0.389 | 0.00 | 3460.3 | 83.13 |
| 0.125 | 0.061 | 0.411 | 0.401 | 0.00 | 3392.0 | 85.74 |
| 0.117 | 0.115 | 0.355 | 0.412 | 0.00 | 3333.1 | 87.09 |
| 0.104 | 0.201 | 0.264 | 0.430 | 0.00 | 3237.1 | 86.89 |
| 0.104 | 0.201 | 0.264 | 0.430 | 0.15 | 3224.1 | 88.7 |
| 0.101 | 0.220 | 0.244 | 0.433 | 0.00 | 3216.2 | 86.11 |
| 0.101 | 0.220 | 0.244 | 0.433 | 0.20 | 3203.1 | 88.9 |
| 0.097 | 0.250 | 0.213 | 0.434 | 0.00 | 3182.7 | 84.76 |
| 0.097 | 0.250 | 0.213 | 0.434 | 0.25 | 3174.7 | 89.3 |
| 0.087 | 0.313 | 0.146 | 0.452 | 0.00 | 3112 | 81.76 |
| 0.087 | 0.313 | 0.146 | 0.452 | 0.30 | 3124.0 | 90.0 |
| Part 2. | | | | | | |
| 0.085 | 0.324 | 0.135 | 0.455 | 0.00 | 3100.8 | 81.22 |
| 0.085 | 0.324 | 0.135 | 0.455 | 0.30 | 3115.7 | 90.0 |
| 0.084 | 0.333 | 0.125 | 0.456 | 0.00 | 3091.0 | 80.77 |
| 0.084 | 0.333 | 0.125 | 0.456 | 0.35 | 3111.9 | 90.0 |
| 0.075 | 0.309 | 0.065 | 0.468 | 0.00 | 3027.0 | 77.67 |
| 0.075 | 0.309 | 0.065 | 0.468 | 0.40 | 3076.0 | 90.4 |
| 0.074 | 0.398 | 0.056 | 0.470 | 0.00 | 3017.9 | 77.21 |

TABLE 8-continued

Maximum CRI obtainable from metameric mixes of quad blends based on #246, #2194, #2293, and #2345. Comparison with no halo addition. Quad blends listed in order of increasing #2194 content. LWX color point.

| Quad-blend content as fractional SPD(#XXXX) | | | | Halo | | |
|---|---|---|---|---|---|---|
| #246 | #2194 | #2293 | #2345 | fract. | Lumens | CRI |
| 0.074 | 0.398 | 0.056 | 0.470 | 0.40 | 3071.0 | 90.5 |
| 0.066 | 0.452 | 0.000 | 0.481 | 0.00 | 2958.3 | 73.82 |
| 0.066 | 0.452 | 0.000 | 0.481 | 0.45 | 3044.9 | 90.4 |

2. Blends of #246: #2194: #2288: #2345.

The quad blend considered previously contained the rare-earth-activated, green-emitting phosphor #2293. In the set of blends to be discussed next #2293 is replaced by the #2288 phosphor, which does not contain any rare-earth elements and is therefore cheaper. After the derivation of the output characteristics of such blends, the effect of metameric mixing is considered.

A summary listing of the resulting formulations of highest CRI is given in TABLE 9. The latter is analogous to TABLE 8, but for the new choice of phosphor types.

Figure 18:
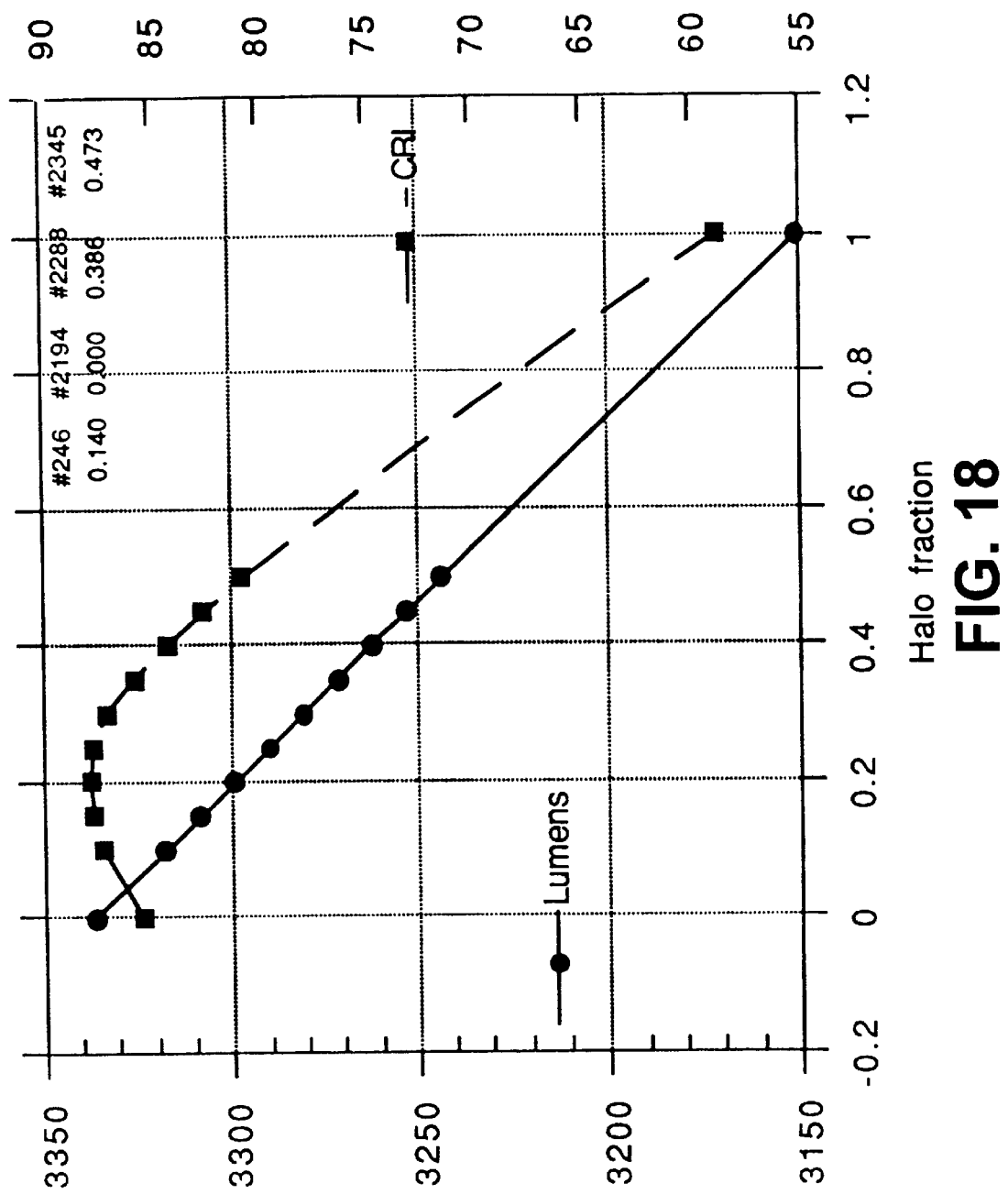
FIG. 18 shows the increased CRI resulting from metameric mixing for a specific LWX quad-blend based on phosphors #246, #2194, #2288, and #2345, according to the $c_i$ mixing coefficients listed in the Figure.
Figure 19:
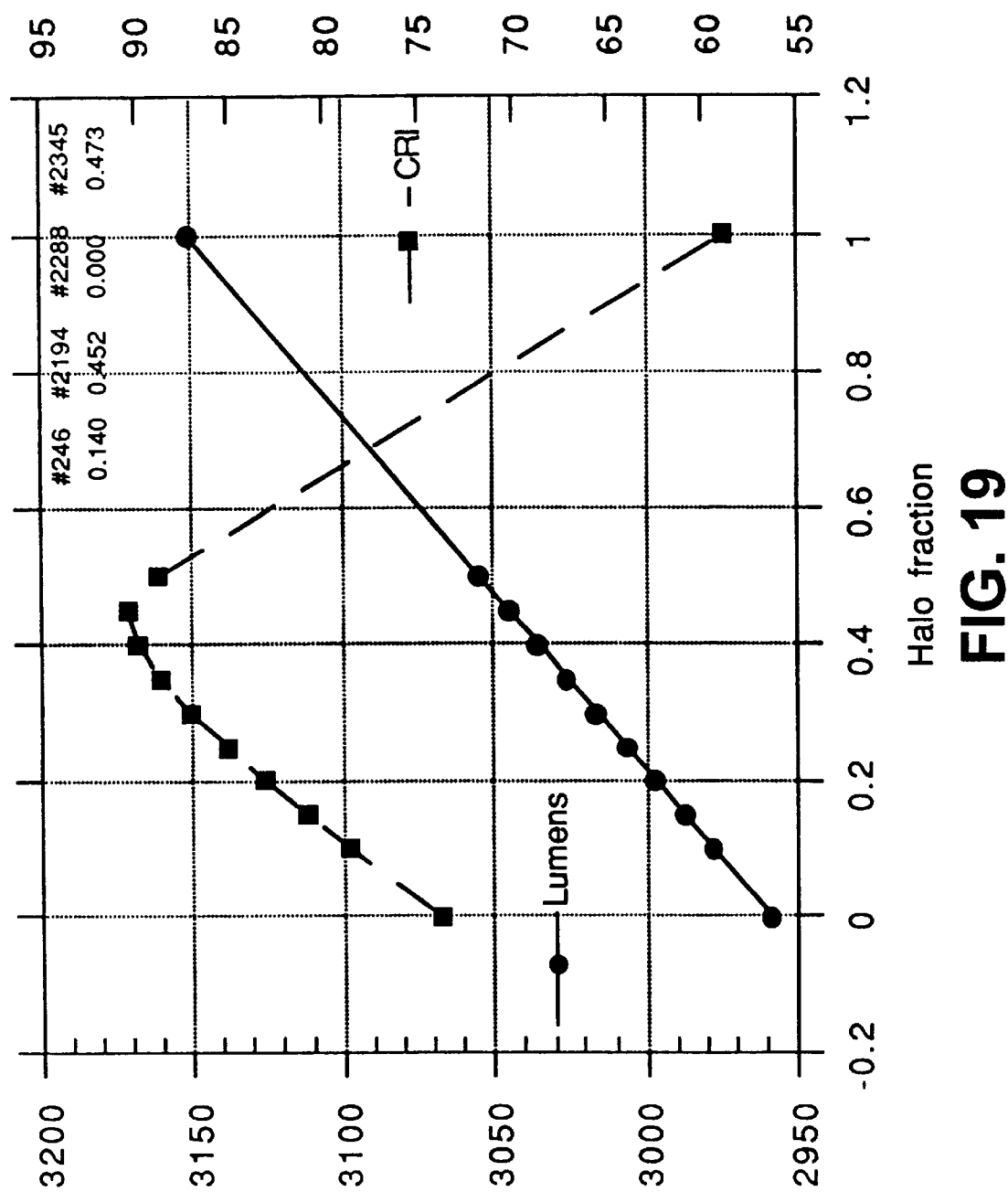
FIG. 19 shows the increase in CRI and lumen output resulting from metameric mixing for a specific LWX tri-blend based on phosphors #246, #2194, and #2345, according to the $c_i$ mixing coefficients listed in the Figure. The CRI exceeds 90 at 45% halo admixing.

There are two limiting cases of TABLE 9, whereby the quad blends degenerate into tri-component blends (tri-blends), namely the target color-point can be reached with no #2194 present (first two rows), or with no #2288 present (last two rows). These two cases deserve an explicit treatment. The pertinent results are summarized in TABLE 10 and FIG. 18 for the tri-blend based on #246, #2288, and 2345, and in TABLE 11 and FIG. 19 for the one based on #246, #2194, and #2345.

In the case of the tri-blend with #246, #2288, and #2345 (TABLE 10 and FIG. 18) the halo addition produces an increase in CRI for halo fractions $c_{halo}$ in the range $0 < c_{halo} \geq 0.4$, up to a peak value of 87.8 for $c_{halo} = 020$. This entails a modest lumen loss of ~37 lumens, that is ~1% by comparison with the starting tri-blend.

The lumen output of the tri-blend with #246, #2194, and #2345 (~2,960 lumens) is lower (TABLE 9, Part 2) than that of the LWX halo-blend. Therefore the metameric mixing produces an increase in brightness. Simultaneously, the CRI rises over a broad range of halo fractions (TABLE 11 and FIG. 19). The remarkably-high CRI and lumen values (CRI>90; lumens in excess of 3,000) should be noted for the metameric mix with 45% halo (TABLE 11 and FIG. 19). In view of the high halo content, this type of blend will also be quite inexpensive.

TABLE 9

Maximum CRI obtainable from metameric mixes of quad blends based on #246, #2194, #2288, and #2345. Comparison with no halo addition. Quad blends listed in order of increasing #2194 content. LWX color point.

| Quad-blend content as fractional SPD(#XXXX) | | | | Halo | | |
|---|---|---|---|---|---|---|
| #246 | #2194 | #2288 | #2345 | fract. | Lumens | CRI |
| Part 1. | | | | | | |
| 0.140 | 0.000 | 0.386 | 0.473 | 0.00 | 3336.2 | 85.4 |
| 0.140 | 0.000 | 0.386 | 0.473 | 0.20 | 3299.1 | 87.8 |
| 0.128 | 0.070 | 0.326 | 0.474 | 0.00 | 3277.8 | 84.3 |
| 0.128 | 0.070 | 0.326 | 0.474 | 0.25 | 3246.0 | 88.5 |
| 0.117 | 0.140 | 0.267 | 0.475 | 0.00 | 3219 | 82.7 |

TABLE 9-continued

Maximum CRI obtainable from metameric mixes of quad blends based on #246, #2194, #2288, and #2345. Comparison with no halo addition. Quad blends listed in order of increasing #2194 content. LWX color point.

| Quad-blend content as fractional SPD(#XXXX) | | | | Halo | | |
|---|---|---|---|---|---|---|
| #246 | #2194 | #2288 | #2345 | fract. | Lumens | CRI |
| 0.117 | 0.140 | 0.267 | 0.475 | 0.25 | 3202.2 | 89.0 |
| 0.116 | 0.148 | 0.260 | 0.475 | 0.00 | 3212.2 | 82.5 |
| 0.104 | 0.201 | 0.264 | 0.430 | 0.30 | 3193.8 | 89.1 |
| 0.111 | 0.177 | 0.235 | 0.476 | 0.00 | 3188.4 | 81.8 |
| 0.111 | 0.177 | 0.235 | 0.476 | 0.30 | 3177.1 | 89.3 |
| 0.101 | 0.237 | 0.184 | 0.477 | 0.00 | 3138.4 | 80.3 |
| 0.101 | 0.237 | 0.184 | 0.477 | 0.35 | 3142.4 | 89.7 |
| Part 2. | | | | | | |
| 0.100 | 0.246 | 0.176 | 0.477 | 0.00 | 3130.6 | 80.1 |
| 0.100 | 0.246 | 0.176 | 0.477 | 0.35 | 3137.6 | 89.8 |
| 0.086 | 0.329 | 0.104 | 0.478 | 0.00 | 3060.9 | 77.8 |
| 0.086 | 0.329 | 0.104 | 0.478 | 0.40 | 3096.8 | 90.2 |
| 0.085 | 0.337 | 0.098 | 0.479 | 0.00 | 3054.5 | 77.6 |
| 0.085 | 0.337 | 0.098 | 0.479 | 0.40 | 3093.0 | 90.3 |
| 0.083 | 0.351 | 0.086 | 0.479 | 0.00 | 3042.5 | 77.1 |
| 0.083 | 0.351 | 0.086 | 0.479 | 0.40 | 3085.7 | 90.3 |
| 0.075 | 0.397 | 0.047 | 0.480 | 0.00 | 3004.7 | 75.7 |
| 0.075 | 0.397 | 0.047 | 0.480 | 0.40 | 3063.1 | 90.2 |
| 0.066 | 0.452 | 0.00 | 0.480 | 0.00 | 2958.3 | 73.8 |
| 0.066 | 0.452 | 0.00 | 0.480 | 0.45 | 3044.9 | 90.4 |

TABLE 10

Effect of adding the LWX halo-blend to LWX quad-blends.
QUAD blend: 0.140 (#246); 0.000 (#2194); 0.386 (#2288); 0.473 (#2345)
LWX halo-blend: 0.120 (#4381); 0.796 (#4459); 0.084 (#4300).

| Halo fraction | Quad fraction | Lumens | CRI |
|---|---|---|---|
| 0.00 | 1.00 | 3336.2 | 85.44 |
| 0.10 | 0.90 | 3317.6 | 87.25 |
| 0.15 | 0.85 | 3308.3 | 87.62 |
| 0.20 | 0.80 | 3299.1 | 87.81 |
| 0.25 | 0.75 | 3289.8 | 87.72 |
| 0.30 | 0.70 | 3280.5 | 87.05 |
| 0.35 | 0.65 | 3271.2 | 85.78 |
| 0.40 | 0.60 | 3262.0 | 84.29 |
| 0.45 | 0.55 | 3252.7 | 82.60 |
| 0.50 | 0.50 | 3243.4 | 80.76 |
| 1.00 | 0.00 | 3150.6 | 58.83 |

TABLE 11

Effect of adding the LWX halo-blend to LWX quad-blends.
QUAD blend: 0.066 (#246); 0.452 (#2194); 0.000 (#2288); 0.481 (#2345)
LWX halo-blend: 0.120 (#4381); 0.796 (#4459); 0.084 (#4300).

| Halo fraction | Quad fraction | Lumens | CRI |
|---|---|---|---|
| 0.00 | 1.00 | 2958.4 | 73.82 |
| 0.10 | 0.90 | 2977.6 | 78.72 |
| 0.15 | 0.85 | 2987.2 | 80.96 |
| 0.20 | 0.80 | 2996.9 | 83.09 |
| 0.25 | 0.75 | 3006.5 | 85.12 |
| 0.30 | 0.70 | 3016.1 | 87.08 |
| 0.35 | 0.65 | 3025.7 | 88.68 |
| 0.40 | 0.60 | 3035.3 | 89.87 |
| 0.45 | 0.55 | 3044.9 | 90.43 |
| 0.50 | 0.50 | 3054.5 | 88.82 |
| 1.00 | 0.00 | 3150.6 | 58.83 |

3. Blends of #246; #2288; #2345, #290.

Cost considerations require that the content of the expensive #2345 phosphor be minimized in blends. This could be achieved by adding to the combination of phosphors #246, #2288, and #2345 an inexpensive red-emitting material, such as phosphor #290.

Accordingly, TABLE 12 gives an overview of the predicted performance (lumens and CRI) of quad blends containing #246, #2288, #2345, and #290. As in the previous cases, the metameric mixes with the highest CRI are also indicated, where appropriate.

Figure 20:
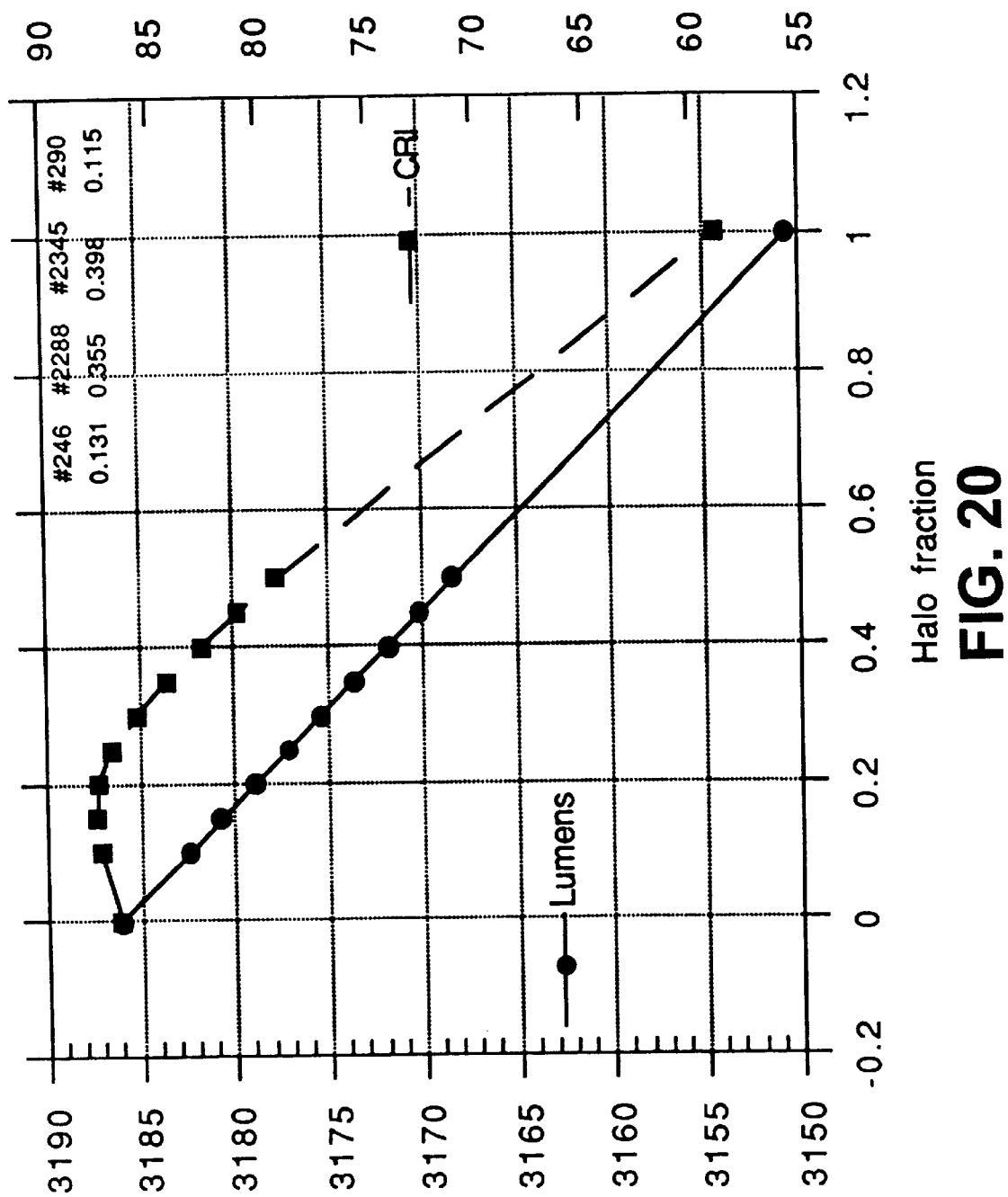
FIG. 20 shows the increased CRI resulting from metameric mixing for a specific LWX quad-blend based on phosphors #2465, #2288, #2345, and #290, according to the $c_i$ mixing coefficients listed in the Figure.

The highest CRI (87.7 at ~3,180 lumens) is obtained in the presence of #290 when $c_{\#290}$=0.115, and for a 15% mix with the halo blend (TABLE 13 and FIG. 20). For $c_{\#290}$= 0.115, halo admixing up to ~0.3 increases the blend CRI. The lumen output of the metameric mixes decreases linearly with the halo content.

TABLE 12

Maximum CRI obtainable from metameric mixes of quad blends based on #246, #2288, #2345 and #290. Comparison with no halo addition. Quad blends listed in order of increasing #290 content. LWX color point.

| Quad-blend content as fractional SPD (#XXXX) | | | | | | |
|---|---|---|---|---|---|---|
| #246 | #2288 | #2345 | #290 | Halo fract. | Lumens | CRI |
| 0.140 | 0.386 | 0.473 | 0.000 | 0.00 | 3336.3 | 85.4 |
| 0.140 | 0.386 | 0.473 | 0.000 | 0.20 | 3299.2 | 87.8 |
| 0.131 | 0.354 | 0.398 | 0.115 | 0.00 | 3186.0 | 86.6 |
| 0.131 | 0.354 | 0.398 | 0.115 | 0.15 | 3180.7 | 87.7 |
| 0.122 | 0.320 | 0.315 | 0.242 | 0.00 | 3019.1 | 87.0 |
| 0.112 | 0.283 | 0.227 | 0.337 | 0.00 | 2841.9 | 87.0 |
| 0.102 | 0.247 | 0.142 | 0.507 | 0.00 | 2672.3 | 86.0 |
| 0.100 | 0.237 | 0.118 | 0.544 | 0.00 | 2623.7 | 85.3 |
| 0.095 | 0.219 | 0.076 | 0.609 | 0.00 | 2539.2 | 83.9 |
| 0.090 | 0.201 | 0.031 | 0.677 | 0.00 | 2450.4 | 82.2 |
| 0.088 | 0.196 | 0.018 | 0.697 | 0.00 | 2424.2 | 81.6 |
| 0.086 | 0.188 | 0.000 | 0.725 | 0.00 | 2386.9 | 80.7 |

TABLE 13

Effect of adding the LWX halo-blend to LWX quad-blends.
QUAD blend: 0.131 (#246); 0.355 (#2288); 0.398 (#2345); 0.115 (#290)
LWX halo-blend: 0.120 (#4381); 0.796 (#4459); 0.084 (#4300).

| Halo fraction | Quad fraction | Lumens | CRI |
|---|---|---|---|
| 0.00 | 1.00 | 3186.0 | 86.57 |
| 0.10 | 0.90 | 3182.4 | 87.49 |
| 0.15 | 0.85 | 3180.7 | 87.67 |
| 0.20 | 0.80 | 3178.9 | 87.58 |
| 0.25 | 0.75 | 3177.1 | 86.93 |
| 0.30 | 0.70 | 3175.4 | 85.74 |
| 0.35 | 0.65 | 3173.6 | 84.35 |
| 0.40 | 0.60 | 3171.8 | 82.78 |
| 0.45 | 0.55 | 3170.1 | 81.07 |
| 0.50 | 0.50 | 3168.3 | 79.26 |
| 1.00 | 0.00 | 3150.6 | 58.83 |

4. Blends containing Gd pentaborate:Ce:Mn as the red emitter.

Figure 11:
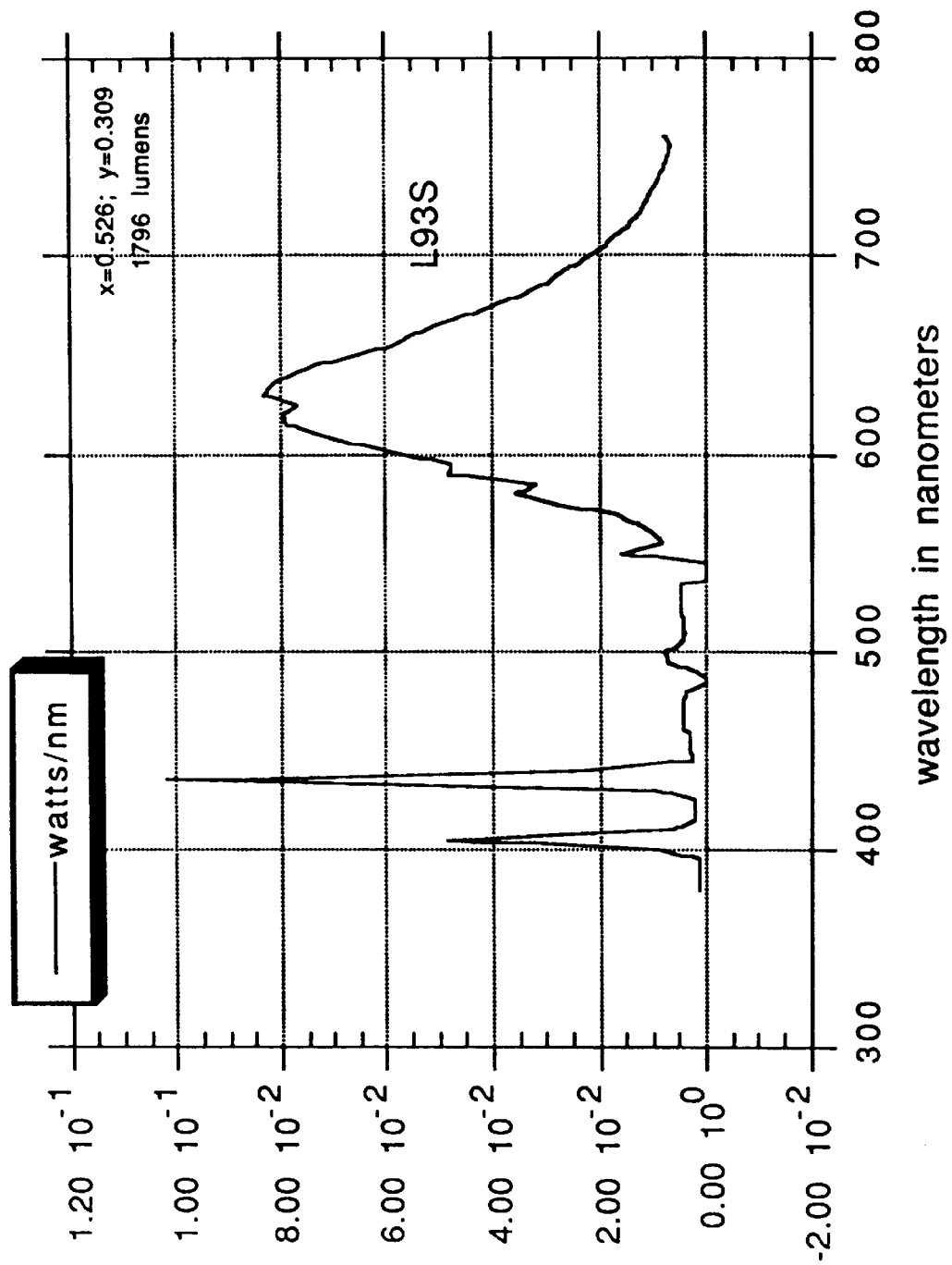
FIG. 11 shows the SPD associated with the Gd pentaborate:Ce;Mn phosphor, after 100 hours of operation in a 40 Watt-T12.
Figure 12:
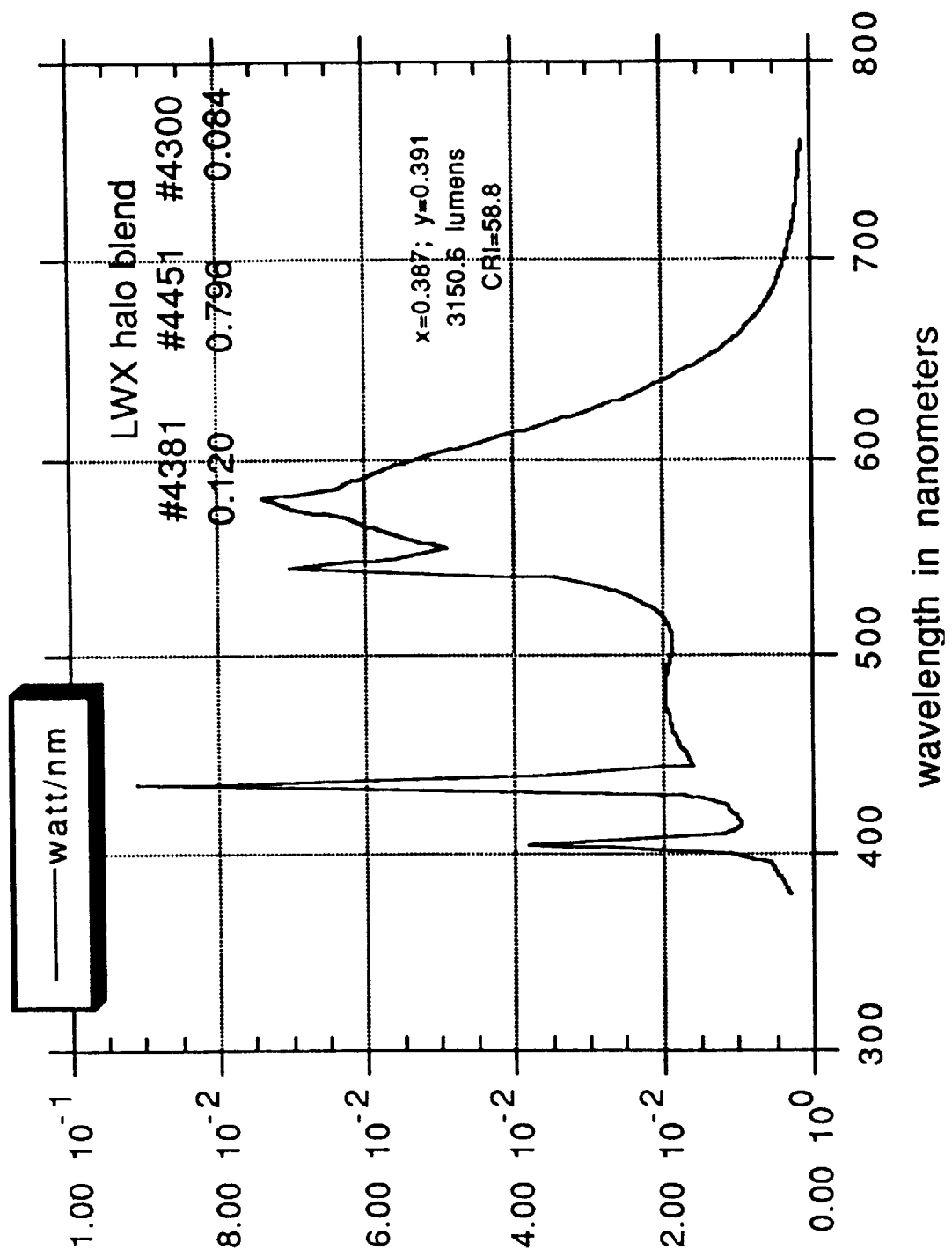
FIG. 12 shows the SPD for the halo blend at the LWX color point (x=0.387; y=0.391), with the composition and output properties indicated in the body of the Figure.
Figure 21:
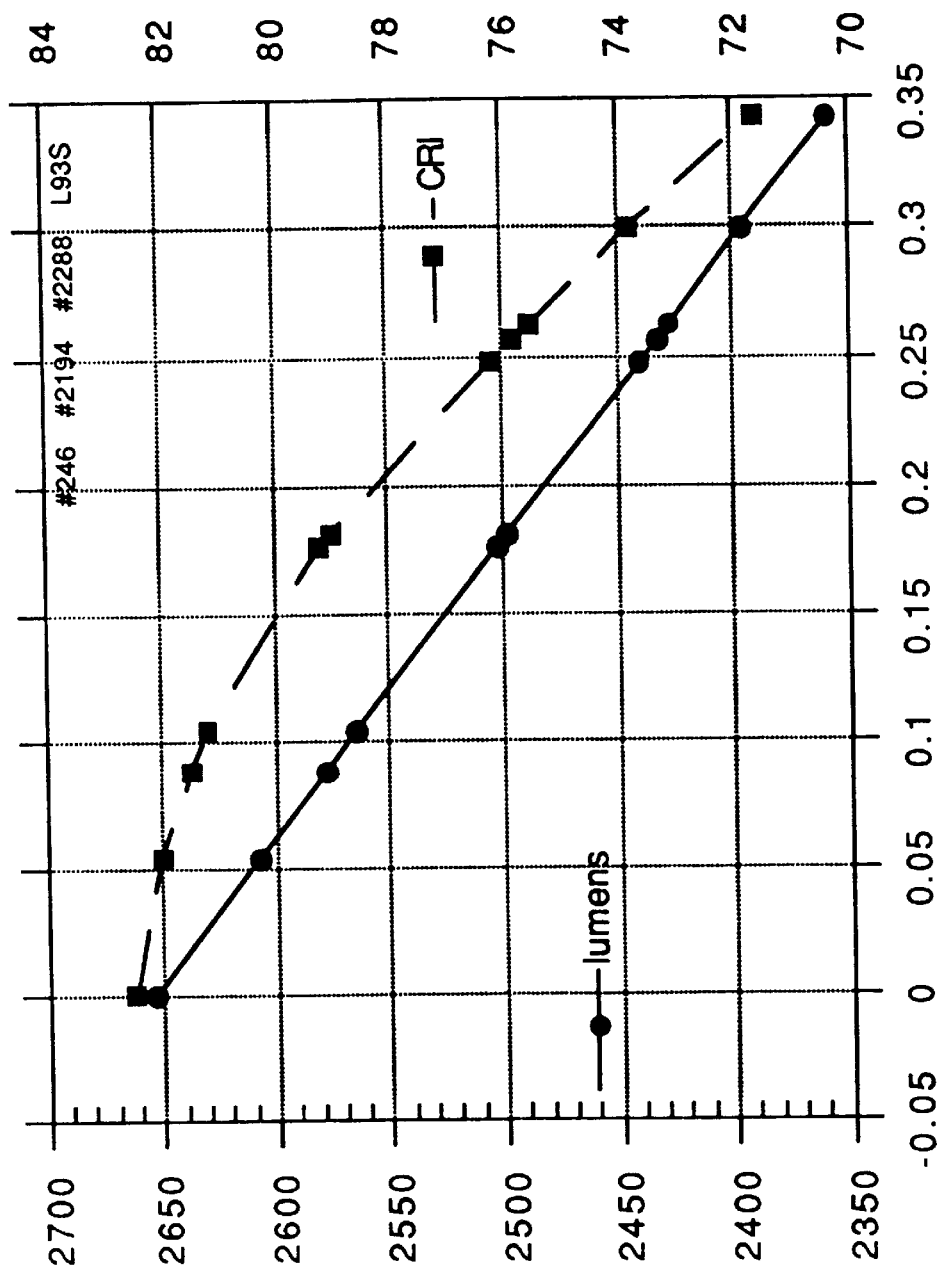
FIG. 21 shows the lumen and CRI characteristics of quad blend containing phosphor types #246, #2194, #2288, and L93S as a function of the fractional content in the #2194 phosphor. Blends for the LWX color point (x=0.387; y=0.391).

Compared with the emission from phosphor #290 (FIG. 7) the emission from the pentaborate phosphor (L93S) is shifted to longer wavelengths and peaks at ~630 nm (FIG. 11). Starting from a tri-blend containing #246. #2288, and the pentaborate, phosphor #2194 is gradually added. This produces a monotonic drop in lumens and CRI, with the latter ultimately slumping down to ~71.6 from the initial value of 82.5 (TABLE 14 and FIG. 21).

Figure 22:
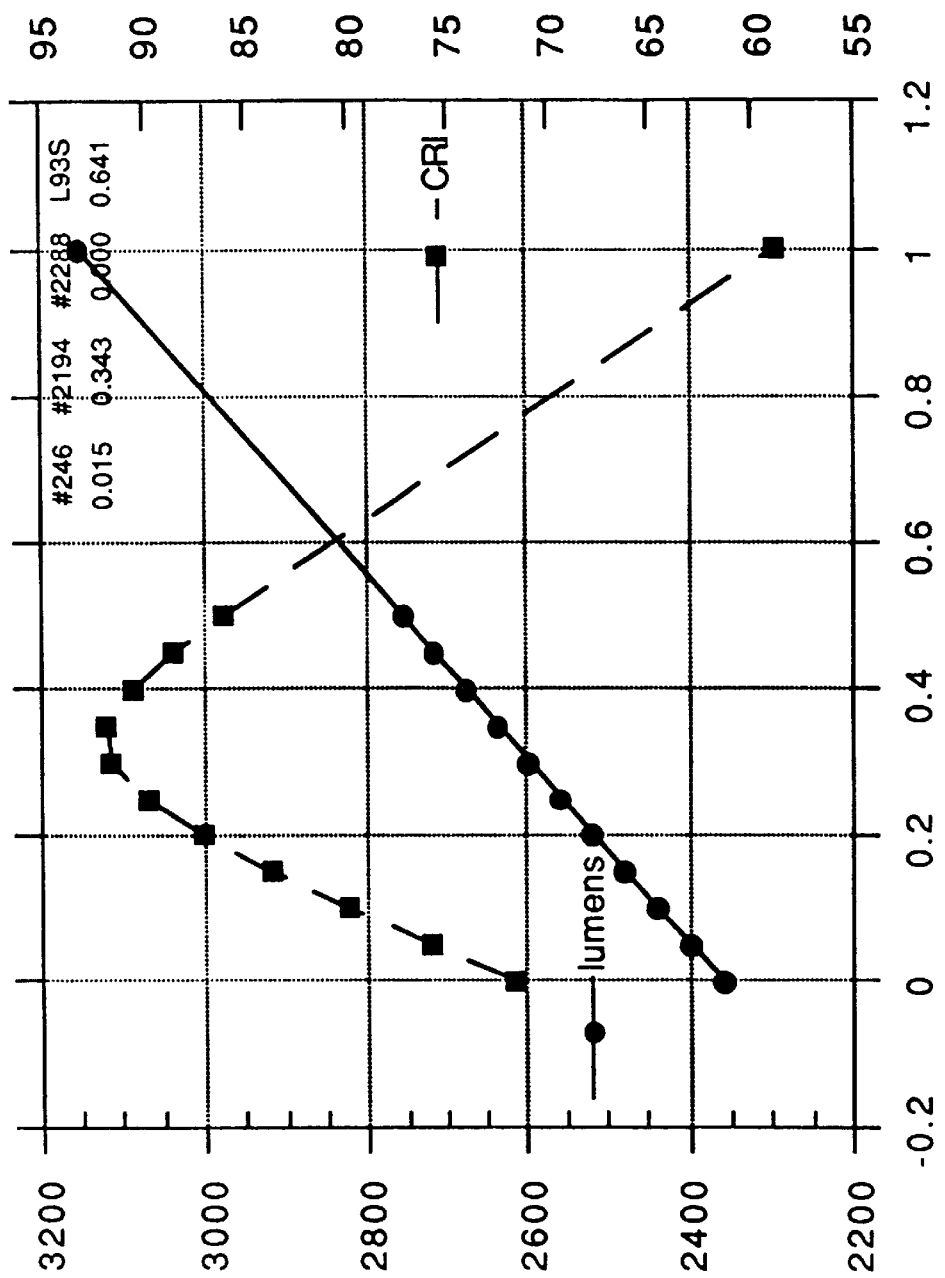
FIG. 22 shows the increase in CRI and lumen output resulting from metameric mixing for a specific LWX tri-blend based on phosphors #246, #2194, #2284, and L93S, according to the $c_i$ mixing coefficients listed in the Figure. The CRI exceeds 90 for halo fractions ranging from 0.25 to 0.40.

The metameric mixing raises both lumen out and CRI, the latter way above the value of 90. Details on the effect of the metameric mixing are listed in the summary TABLE 15 and in FIG. 22 for the end-of-series novel formulation:

$$0.015 \cdot SPD(\#246) + 0.343 \cdot SPD(\#2194) + 0.641 \cdot SPD(L93S) \qquad (6)$$

TABLE 14

Quad blends based on #246, #2194, #2288 and L93S, in order of increasing #2194 content. LWX color point.

| Quad-blend content as SPD (#XXXX) | | | | | |
|---|---|---|---|---|---|
| #246 | #2194 | #2288 | L93S | Lumens | CRI |
| 0.071 | 0.000 | 0.294 | 0.633 | 2653.4 | 82.5 |
| 0.063 | 0.054 | 0.248 | 0.634 | 2606.9 | 82.0 |
| 0.057 | 0.088 | 0.218 | 0.635 | 2577.2 | 81.5 |
| 0.054 | 0.104 | 0.205 | 0.635 | 2563.9 | 81.2 |
| 0.042 | 0.176 | 0.143 | 0.637 | 2501.8 | 79.2 |
| 0.041 | 0.181 | 0.138 | 0.637 | 2497.3 | 79.0 |
| 0.030 | 0.248 | 0.081 | 0.639 | 2439.9 | 76.2 |
| 0.029 | 0.257 | 0.074 | 0.639 | 2432.1 | 75.8 |
| 0.028 | 0.263 | 0.068 | 0.639 | 2427.0 | 75.5 |
| 0.022 | 0.300 | 0.037 | 0.640 | 2395.2 | 73.8 |
| 0.015 | 0.343 | 0.000 | 0.641 | 2358.1 | 71.6 |

TABLE 15

Maximum CRI obtainable from metameric mixes of quad blends based on #246, #2194, #2288 and L93S. Comparison with no halo addition. Quad blends listed in order of increasing #2194 content. LWX color point.

| Quad-blend content as fractional SPD (#XXXX) | | | | | | |
|---|---|---|---|---|---|---|
| #246 | #2194 | #2288 | L93S | Halo fract. | Lumens | CRI |
| 0.071 | 0.000 | 0.294 | 0.633 | 0.00 | 2653.4 | 82.5 |
| 0.071 | 0.000 | 0.294 | 0.633 | 0.20 | 2752.8 | 87.1 |
| 0.063 | 0.054 | 0.248 | 0.634 | 0.00 | 2606.9 | 82.0 |
| 0.063 | 0.054 | 0.248 | 0.634 | 0.20 | 2715.6 | 88.1 |
| 0.057 | 0.088 | 0.218 | 0.635 | 0.00 | 2577.2 | 81.5 |
| 0.057 | 0.088 | 0.218 | 0.635 | 0.20 | 2691.9 | 88.6 |
| 0.054 | 0.104 | 0.205 | 0.635 | 0.00 | 2563.9 | 81.2 |
| 0.054 | 0.104 | 0.205 | 0.635 | 0.25 | 2739.9 | 88.9 |
| 0.042 | 0.176 | 0.143 | 0.637 | 0.00 | 2501.8 | 79.2 |
| 0.042 | 0.176 | 0.143 | 0.637 | 0.25 | 2664.0 | 90.0 |
| 0.041 | 0.181 | 0.138 | 0.637 | 0.00 | 2497.3 | 79.0 |
| 0.041 | 0.181 | 0.138 | 0.637 | 0.25 | 2660.6 | 90.1 |
| 0.030 | 0.248 | 0.081 | 0.639 | 0.00 | 2439.9 | 76.2 |
| 0.030 | 0.248 | 0.081 | 0.639 | 0.30 | 2653.2 | 91.0 |
| 0.029 | 0.257 | 0.074 | 0.639 | 0.00 | 2432.1 | 75.8 |
| 0.029 | 0.257 | 0.074 | 0.639 | 0.30 | 2647.1 | 91.1 |
| 0.028 | 0.263 | 0.068 | 0.639 | 0.00 | 2427.0 | 75.5 |
| 0.028 | 0.263 | 0.068 | 0.639 | 0.30 | 2644.1 | 91.2 |
| 0.022 | 0.300 | 0.037 | 0.640 | 0.00 | 2395.2 | 73.8 |
| 0.022 | 0.300 | 0.037 | 0.640 | 0.30 | 2621.9 | 91.5 |
| 0.015 | 0.343 | 0.000 | 0.641 | 0.00 | 2358.1 | 71.6 |
| 0.015 | 0.343 | 0.000 | 0.641 | 0.35 | 2635.5 | 91.9 |

TABLE 16

Effect of adding the LWX halo-blend to LWX quad-blends.
QUAD blend: 0.015 (#246); 0.343 (#2194); 0.000 (#2288); 0.641 (L93S)
LWX halo-blend: 0.120 (#4381); 0.796 (#4459); 0.084 (#4300).

| Halo fraction | Quad fraction | Lumens | CRI |
|---|---|---|---|
| 0.00 | 1.00 | 2358.1 | 71.60 |
| 0.05 | 0.95 | 2397.7 | 75.84 |
| 0.10 | 0.90 | 2437.3 | 79.90 |
| 0.15 | 0.85 | 2477.0 | 83.76 |
| 0.20 | 0.80 | 2516.6 | 87.04 |
| 0.25 | 0.75 | 2556.2 | 89.75 |
| 0.30 | 0.70 | 2595.9 | 91.60 |
| 0.35 | 0.65 | 2635.5 | 91.85 |
| 0.40 | 0.60 | 2675.1 | 90.54 |
| 0.45 | 0.55 | 2714.7 | 88.55 |
| 0.50 | 0.50 | 2754.4 | 86.13 |
| 1.00 | 0.00 | 3150.6 | 58.83 |

5. Blends of #246; #2194; #2345, and #290.

The quad blends considered next contain the two red emitters (#2345 and #290), as in the previous blends, the usual #246 as blue emitter, and #2194 as the green emitter. The results for the quad blends and their metameric mixes are summarized in TABLE 17. In the absence of #290 the tri-blend brightness is of ~2,958 lumens with a CRI of 73.8 (first row of TABLE 17). The addition of #290 improves dramatically the CRI, up to 90, but exacts a toll in brightness, mainly because the replacement of #2345 by the relatively low-brightness #290 phosphor.

Figure 23:
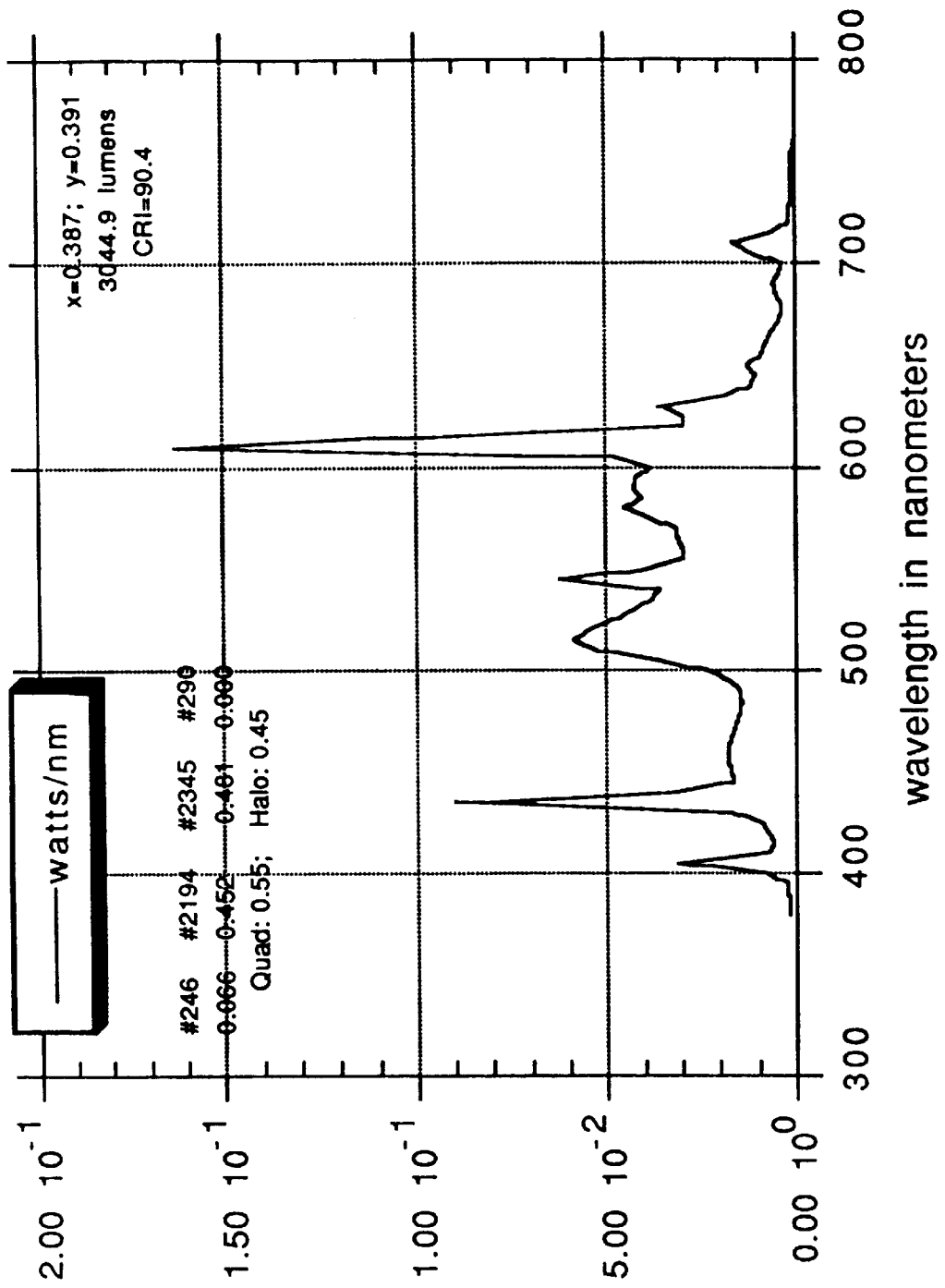
FIG. 23 shows the SPD of a LWX metameric mix based on a tri-blend containing phosphors #246, #2194, and #2345. Mix of 0.45 halo blend and 0.55 quad blend. CRI at 90.4 and about 3045 lumens.

Some of the lumen losses can be recouped by halo addition. In all cases CRI values of 90 and more can be reached. For the particular case of the tri-blend with no #290, a substantial halo addition (45%) produces a CRI of 90.4 at 3045 lumens (row 2 of TABLE 12). The pertinent SPD of such a metameric mix is shown in FIG. 23. This is the same tri-blend discussed in connection with the blends of #246, #2194, #2288, and #2345.

TABLE 17

Maximum CRI obtainable from metameric mixes of quad blends based on #246, #2194, #2345 and #290. Comparison with no halo addition.
Quad blends listed in order of increasing #2194 content. LWX color point.

| Quad-blend content as fractional SPD (#XXXX) | | | | | | |
|---|---|---|---|---|---|---|
| #246 | #2194 | #2345 | #290 | Halo fract. | Lumens | CRI |
| 0.066 | 0.452 | 0.481 | 0.000 | 0.00 | 2958.4 | 73.8 |
| 0.066 | 0.452 | 0.481 | 0.000 | 0.45 | 3044.9 | 90.4 |
| 0.064 | 0.420 | 0.415 | 0.100 | 0.00 | 2854.2 | 76.2 |
| 0.064 | 0.420 | 0.415 | 0.100 | 0.40 | 2972.8 | 90.6 |
| 0.061 | 0.382 | 0.338 | 0.217 | 0.00 | 2732.1 | 79.2 |
| 0.061 | 0.382 | 0.338 | 0.217 | 0.35 | 2878.6 | 90.7 |
| 0.059 | 0.344 | 0.259 | 0.337 | 0.00 | 2607.2 | 82.4 |
| 0.059 | 0.344 | 0.259 | 0.337 | 0.30 | 2770.3 | 90.8 |
| 0.058 | 0.338 | 0.246 | 0.356 | 0.00 | 2587.2 | 83.0 |
| 0.058 | 0.338 | 0.246 | 0.356 | 0.25 | 2728.1 | 90.6 |
| 0.055 | 0.284 | 0.136 | 0.524 | 0.00 | 2412.4 | 87.6 |
| 0.055 | 0.284 | 0.136 | 0.524 | 0.15 | 2523.1 | 90.8 |
| 0.052 | 0.252 | 0.070 | 0.624 | 0.00 | 2307.9 | 89.7 |
| 0.052 | 0.252 | 0.070 | 0.624 | 0.10 | 2392.2 | 90.4 |
| 0.052 | 0.246 | 0.057 | 0.643 | 0.00 | 2288.4 | 89.9 |
| 0.052 | 0.246 | 0.057 | 0.643 | 0.05 | 2331.5 | 90.4 |
| 0.051 | 0.232 | 0.028 | 0.687 | 0.00 | 2242.9 | 90.1 |
| 0.050 | 0.218 | 0.000 | 0.731 | 0.00 | 2197.2 | 89.7 |

IMPLEMENTATION IN LAMPS

Some guidelines will be now outlined for the implementation of the present results into actual lamps. The basic results of the present application are:

1. The spectral profiles of SPD's that are characterized by a pre-assigned color point, and have associated specific values of lumens and CRI.
2. The way to construct such SPD's starting from the SPD of existing single-component lamps, by means of the mixing coefficients $c_i$ introduced in eqs 3 and 4. Up to this point the derivation is rigorous.

1. From SPD fraction to phosphor-weight formulations. From the viewpoint of the lamp technologist the type of photometric information embedded in the $c_1$ mixing coefficients has to be translated into fractional weight composition for the individual phosphors in the blend.

Let us start with the simple assumption that the blend components represent completely randomized and non-interacting subsystems in the lamp, so that the blend output in lamps is the superposition of the contributions from the individual blend components. In such a case, if the single-lamp powder weights are the same, then the photometric $c_i$ coefficients become identical to the fractional weight $w_i$ of the individual phosphor-blend components.

With reference to TABLE 2, the phosphor weight in the single-component lamps is in practice not the same. Then the transition from SPD fractions to weight fractions is a simple matter of multiplying the SPD fractions $c_i$ by the powder-weight of the corresponding lamp, and of re-normalizing, as shown below.

Let $c_n$ be the photometric (SPD) fraction for blend component n, and $s_n$ the phosphor powder-weight of the single-component lamp for blend component n (see TABLE 2). Then the blend fractions $w_n$ in weight units are given by:

$$w_n = (c_n \cdot s_n) : (\Sigma_n c_n \cdot s_n) \tag{7}$$

with n=1,2,3, and 4.

An example of this simple transformation will be carried for the entries of TABLE 3. The ensuing TABLE 18 is a modified version of TABLE 3, in the sense that each pair of rows gives the phosphor-blend compositions expressed in $c_i$ units (fraction of single-lamp SPD) in the top row, and in fractional-weight units in the bottom row.

TABLE 18

Quad blends for the LWX color-print (x = 0.387 and y = 0.391), based on phosphors #246, #2194, #2293, and #2345. Composition, blend weight (in grams) and predicted output in order of increasing #2194. Top row in row pairs: $c_i$ mixing coefficients for the SPD's; bottom row: weight percent fraction in blends.

| #246 | #2194 | #2293 | #2345 | Blend weight | Lumens | CRI |
|---|---|---|---|---|---|---|
| 0.134 | 0.000 | 0.476 | 0.389 |  | 3460.3 | 83.13 |
| 0.112 | 0.000 | 0.506 | 0.382 | 6.21 | 3460.3 | 83.13 |
| 0.125 | 0.061 | 0.411 | 0.401 |  | 3392.0 | 85.74 |
| 0.105 | 0.058 | 0.440 | 0.396 | 6.16 | 3392.0 | 85.74 |
| 0.117 | 0.115 | 0.355 | 0.412 |  | 3333.1 | 87.09 |
| 0.099 | 0.110 | 0.381 | 0.409 | 6.14 | 3333.1 | 87.09 |
| 0.104 | 0.201 | 0.264 | 0.430 |  | 3237.1 | 86.89 |
| 0.088 | 0.195 | 0.286 | 0.431 | 6.09 | 3237.1 | 86.89 |
| 0.101 | 0.220 | 0.244 | 0.433 |  | 3216.2 | 86.11 |
| 0.086 | 0.214 | 0.265 | 0.435 | 6.07 | 3216.2 | 86.11 |
| 0.097 | 0.250 | 0.213 | 0.434 |  | 3182.7 | 84.76 |
| 0.084 | 0.244 | 0.233 | 0.439 | 6.03 | 3182.7 | 84.76 |
| 0.087 | 0.313 | 0.146 | 0.452 |  | 3112.0 | 81.76 |
| 0.075 | 0.307 | 0.160 | 0.458 | 6.02 | 3112.0 | 81.76 |
| 0.085 | 0.324 | 0.135 | 0.455 |  | 3100.8 | 81.22 |
| 0.073 | 0.317 | 0.148 | 0.461 | 6.02 | 3100.8 | 81.22 |
| 0.084 | 0.333 | 0.125 | 0.456 |  | 3091.0 | 80.77 |
| 0.073 | 0.327 | 0.137 | 0.463 | 6.01 | 3091.0 | 80.77 |
| 0.075 | 0.390 | 0.065 | 0.468 |  | 3027.0 | 77.67 |
| 0.065 | 0.385 | 0.072 | 0.478 | 5.97 | 3027.0 | 77.67 |
| 0.074 | 0.398 | 0.056 | 0.470 |  | 3017.9 | 77.21 |
| 0.064 | 0.393 | 0.062 | 0.480 | 5.97 | 3017.9 | 77.21 |
| 0.066 | 0.452 | 0.000 | 0.481 |  | 2958.3 | 73.82 |
| 0.058 | 0.448 | 0.000 | 0.493 | 5.94 | 2958.3 | 73.82 |

2. The linearized blend model of completely randomized, non-interacting blend components may turn out not to be realized in practice for a variety of reasons. Then the weight fractions listed in the previous TABLE may not exactly result in a lamp with the targeted color-point.

In such a case the target SPD (see for instance FIGS. 14 and 23) can always be constructed on the basis of the information provided in the present application, namely from the component SPD's of FIGS. 2 to 11 and the $c_i$ coefficients (and halo-mixing fractions in the case of metameric mixes) listed in the preceding TABLES.

Once the target SPD is thus constructed, it can be used as a bench-mark for the SPD obtained from the experimental lamps, in the sense that the blend composition of the test lamps can be slightly altered by trial-and-error, until the SPD's of the experimental lamps containing the modified blend converge to the bench-mark SPD, and hence to the target color-point.

3. An alternative, more systematic approach, requiring the fabrication and photometric characterization of a single test lamp, is the following. Let $S_{targ}(\lambda_1)$ be the predicted SPD-intensity for the target blend-lamp at the wavelength $\lambda_1$, and $S_e(\lambda_1)$ the actual SPD-intensity observed in the test lamp containing a blend of weight-percent composition characterized by the $w_i$ coefficients of eq. 7. Let us assume that $S_e(\lambda_1) \neq S_{targ}(\lambda_1)$. Then one possible route to bring about the convergence of $S_e$ to $S_{targ}$ is the following.

At a given wavelength $\lambda_m$ the output $S_e(\lambda_m)$ from the experimental lamp can be viewed as arising from the contribution of the component SPD's, here labelled $S_c(\lambda)$, each blend component contributing according to a factor $f_c(\lambda_m)$. So at the wavelength $\lambda_m$, one has for the test lamp:

$$\Sigma_c f_c(\lambda_m) \cdot S_c(\lambda_m) = S_e(\lambda_m) \quad (8)$$

with c=1,2,3, and 4.

We assume now that $f_c(\lambda_m) = f_c$, namely that the $f_c$ factors are independent of wavelength, which is normally the case, unless, for instance, one of the phosphors absorbs the visible radiation emitted by another blend component.

This means that if we choose four different wavelengths $\lambda_m$ in the $S_e$ output, we can set up three more relations such as eq. 8, that constitute together with eq. 8 a system of four linear equations in the four unknown $f_c$ (with c=1,2,3 and 4). Such a system of linear equations is easily solved by means of a well-known procedure, Cramer's rule. The $f_c$ quantities can be viewed as "effective mixing coefficients", compared to the $c_i$ factors of eq. 3, 4 that are derived for the linear model of randomized, non-interacting blend components.

After deriving the $f_c$ values, we use them to arrive at a modified blend formulation. In the corrected blend the following relation will apply at $\lambda_m$:

$$\Sigma_c g_c S_c(\lambda_m) = S_{targ}(\lambda_m) \quad (9)$$

with $c_i$=1,2,3, and 4, and where $S_{targ}(\lambda_m)$ is now the target SPD, rather than the SPD of the test lamp, as in eq. 8. By a repeat of the previous procedure, after selecting three additional wavelengths in the SPD, we can derive again by Cramer's rule the unknown $g_c$ factors, since the $S_c(\lambda_m)$ spectral profiles are known experimentally (see FIGS. 2 to 11), and the $S_{targ}$'s are derived in the present application.

Once the $g_c$ factors have been obtained, we are still left with the problem of establishing a connection between these photometric $g_c$ factors and a blend description in terms of the component fractional-weights. Such a relation, though, has been established for the $f_c$ coefficients, since in the test lamp the $f_c$ coefficients are associated with the fractional weights $w_c$ of the blend components. In particular the $f_c$ coefficient for the case of unit weight (1 gram) of component c is given by:

$$u_c = \frac{f_c}{w_c L_e} \quad (10)$$

with: $u_c$ a power/weight equivalent with dimensions of Watts/(nm·grams); $L_e$ the blend weight in grams for the test lamp; and $w_c$ the weight fraction for component c.

Using eq. 10, the required weight $w_c$ of component c that will satisfy eq. 9 will be then given by the expression:

$$g_c = \frac{f_c}{w_c L_e} \cdot W_c = u_c \cdot W_c \quad (11)$$

and re-arranging eq. 11:

$$W_c = \frac{g_c}{u_c} \quad (12)$$

for the required weight of component c in the blend.

Going back to the mixing coefficients $c_i$ of eqs. 3 and 4, their associated power/weight equivalent was $1/s_i$, with $s_i$ the powder weight of the single-phosphor lamp containing component $s_i$. The ratio:

$$(1/s_c):u_c = (u_c \cdot s_c)^{-1} \quad (13)$$

of the predicted and observed power/weight equivalents is therefore a measure of the deviation from the linearized model of randomly-distributed, non-interacting phosphor blends. The expression $(u_c \cdot s_c)^{-1}$, which will be either greater or less than unity, can be viewed as a "utilization factor" of phosphor c in the particular phosphor blend under consideration.

4. Lamp configurations with two phosphor-layers.

We mentioned earlier the high material costs associated with phosphors containing rare-earth elements. As cost-cutting measure the fluorescent-lamp industry frequently resorts to depositing the phosphors in lamps as two successive layers[hol]. The first layer, adjacent to the inner surface of the glass bulb is generally a phosphor, or phosphor blend, consisting of inexpensive halophosphate phosphors. After drying this phosphor-layer must be insoluble in the suspension used to deposit the subsequent phosphor layer. The second phosphor layer is generally a tri-component blend of rare-earth-containing phosphors, of type #246, #2293 and #2345 in the specific instance of Sylvania lamps.

This top layer of premium phosphors efficiently intercepts and absorbs the UV radiation produced by the plasma, and so it can be applied in relatively thin layers. For example, when the top layer represent 20% in weight of the total phosphor content of the lamp, the resulting thin top layer ("skin coat") absorbs approximately 60% of the available UV radiation, the remaining being converted in the underlying halophosphate phosphor-layer.

As the thickness of the top layer increases, the fraction of total UV-radiation absorbed in the top layer increases, but so does the phosphor cost. At this stage the economy in phosphor cost has to be balanced against the higher manufacturing costs intrinsic to the two-phosphor-layer fabrication.

The results presented here on metameric mixes are applicable also to two-phosphor-layer lamp configurations in the following sense. In the two-phosphor-layer configuration the lamp output is the superposition of the output from the individual phosphor layers. The thickness of the top, or premium, phosphor-layer determines the fraction of available UV radiation to be converted in each individual layer.

The two-phosphor-layer configuration can therefore be viewed as an extreme case of the breakdown, deliberately induced, of the model of randomized blend components.

We have already mentioned that in the "skin-coat" configuration 60% of the available UV radiation is converted in the top layer, and 40% in the halophosphate layer. From the viewpoint of lamp output this is exactly equivalent to having a metameric mix of 60% tri- (or quad-) blend and 40% halo blend.

As a concrete example, we refer to TABLE 8, part 2. There are two metameric mixes based on 60% quad-blend containing #246, #2194, #2293, #235, and 40% halo-blend, such mixes providing CRI values of 90.4 and 90.5 respectively, at brightness levels exceeding 3,000 lumens. This type of output can either be achieved in a single-phosphor-layer configuration, or in a double-phosphor-layer configuration. In the latter case the required weight of the quad blend can be reduced to approximately a third, thus realizing a saving in phosphor costs. In the former case the manufacturing process is faster and less expensive.

REDUCTION TO PRACTICE

Single-phosphor-layer lamps based on the results of the present application were fabricated. One particular formulation was selected for testing, namely the mix listed as the last row of TABLE 9. Instead of phosphor #2194, a related phosphor type, #2196, with a slightly different output was used.

The fractional weight percent of the phosphor components for the tri-blend are listed in TABLE 19.

TABLE 19

Fractional-weight composition for the tri-blend utilized in the lamp tests.

|  | #246 | #2194 | #2345 |
|---|---|---|---|
| Calculated (TABLE 18) | 0.058 | 0.448 | 0.493 |
| Used in the lamp tests | 0.06 | 0.46 | 0.48 |

Figure 24:
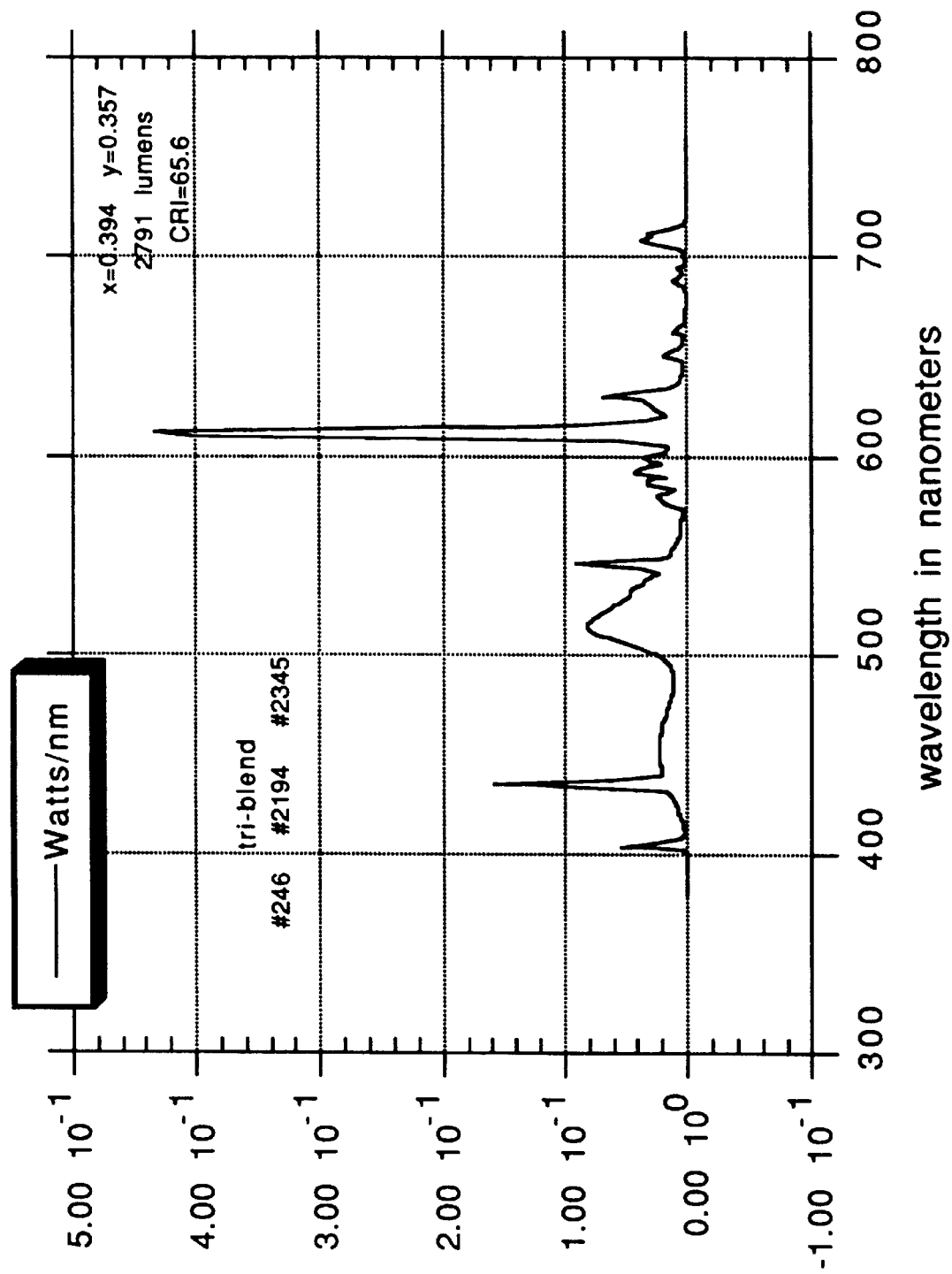
FIG. 24 shows the SPD of the experimental lamp with the tri-blend containing phosphor types #246, #2194, and #2345.
Figure 25:
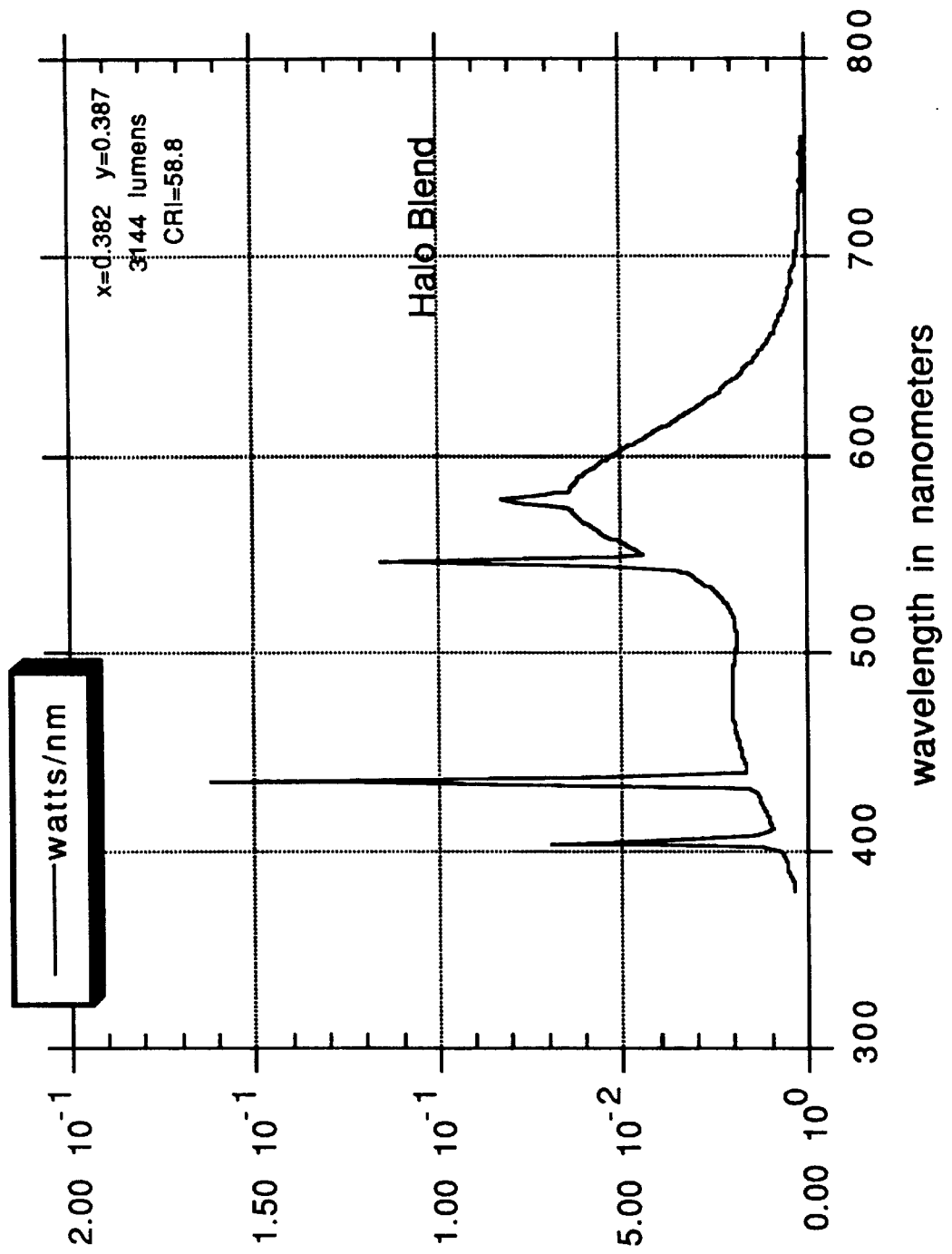
FIG. 25 shows the SPD of the experimental lamp with the halophosphate blends.

Three test lamps were built, containing respectively the tri-blend of TABLE 19, the halophosphate, and metameric mix. The SPD of the lamp containing the tri-blend is shown in FIG. 24. The lamp CRI was 65.6. The SPD of the halophosphate test-lamp is given in FIG. 25. Its CRI was 58.8. The SPD of FIG. 25 should be compared with the predictions of FIG. 12.

Figure 26:
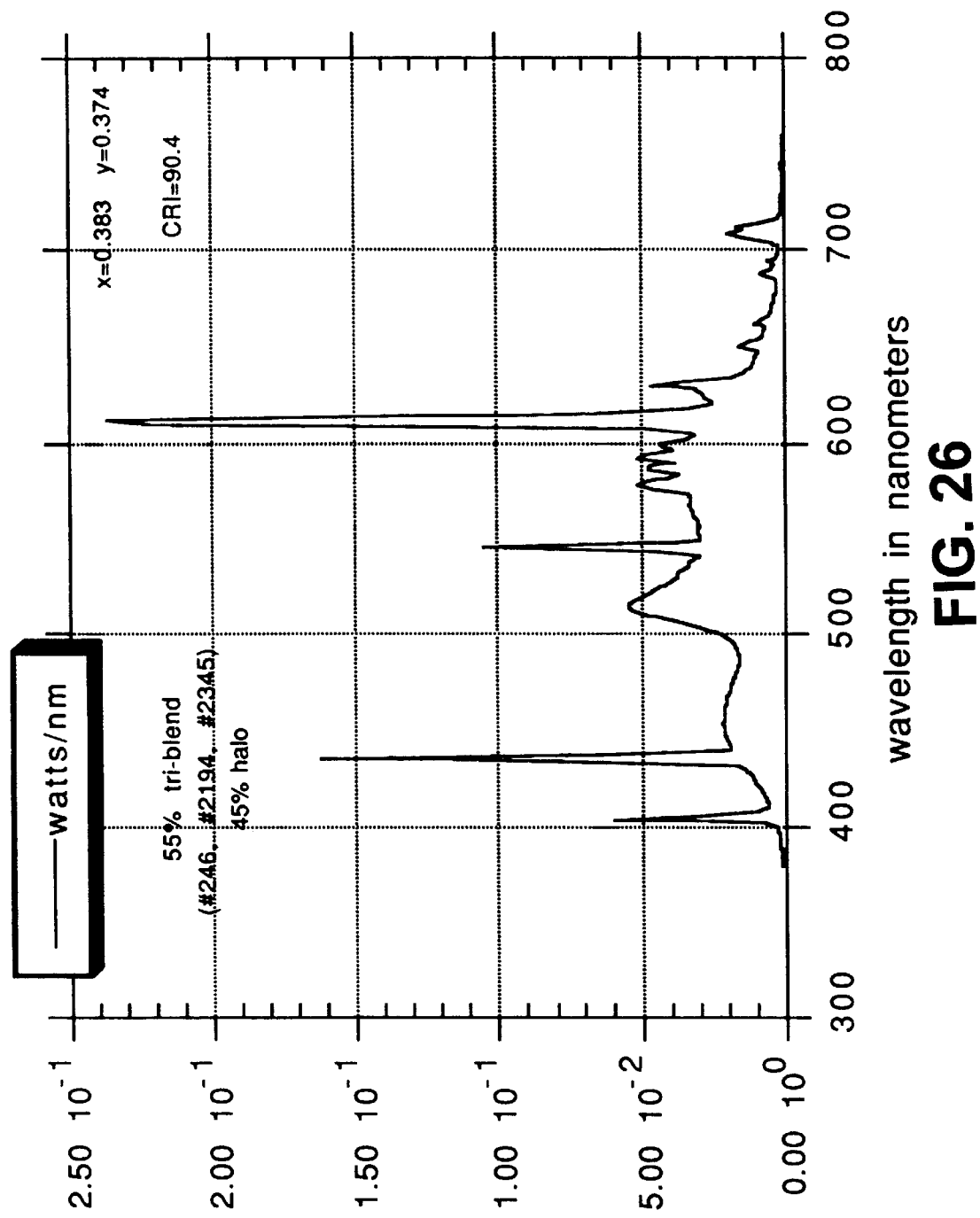
FIG. 26 shows the SPD of the experimental lamp containing the metameric mix of 45% halophosphate phosphor, as per FIG. 25, and 55% of the triblend of FIG. 24.

The metameric mix employed in the test lamp consisted of 45% halophosphate and 55% quadblend, as per the last row of Table s1. The test lamp SPD is displayed in FIG. 26. From the SPD one can derive color coordinates of 0.383 and 0.374, and a CRI of 90.4. The output brightness was 3,086 lumens at 0 hrs and 3,011 lumens at 100 hours, with a 0–100 hrs maintenance of 97.6%. The predictions of TABLE 9 were for 3,045 lumens at 100 hrs and a CRI of 90.4. The SPD of the test lamp of FIG. 26 should be compared with the calculated SPD of FIG. 23. The agreement is excellent. Minor differences in fine-structure components are due to the different spectral resolution of the detectors used for the measurements of the SPD of FIGS. 2 to 11, and for the measurement of the SPD of FIG. 26.

Figure 27:
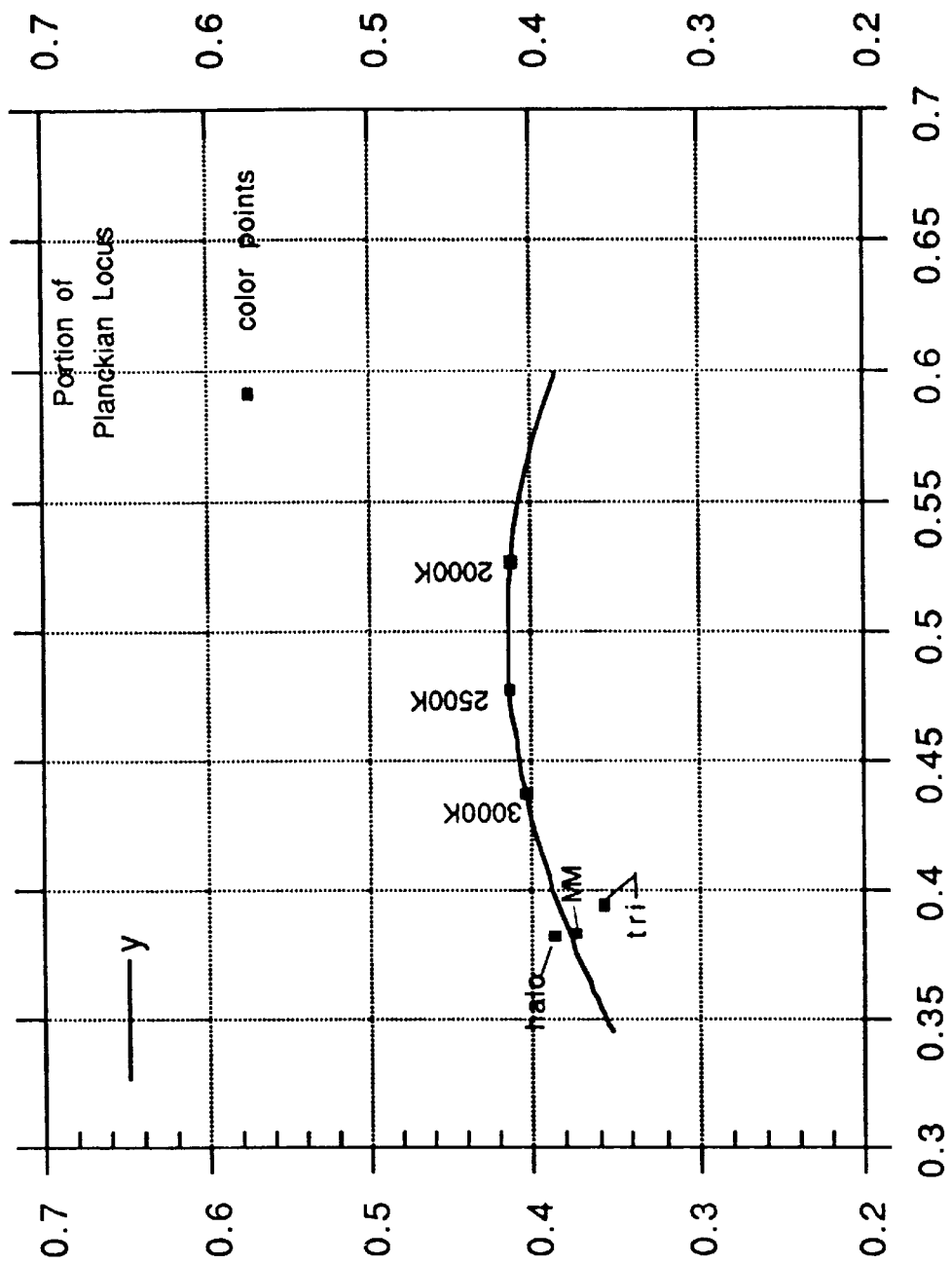
FIG. 27 shows a portion of the planckian locus and location of the color points of the test lamps. Legend: halo, halophosphate-containing lamp of FIG. 25; tri is the tri-blend of FIG. 24; MM is the lamp with the metameric mix of FIG. 26. The remaining color points are for sources at 3000K, 2500K and 2000K.

The location of the color points of the three experimental lamps is shown in FIG. 27 relatively to the planckian locus. The color point of the metameric mix, indicated in the Figure as MM, is seen to fall nicely on the Planckian (black-body) locus.

I claim:

1. A fluorescent lamp comprising a metameric mixture of a plurality of blends of lamp phosphors for converting ultraviolet radiation to visible illumination, each of said blends of lamp phosphors having a different Spectral Power Distribution and substantially identical color coordinates, the color rendering index (CRI) of said metameric mixture being higher than the CRI of each of said blends of lamp phosphors.

2. A fluorescent lamp according to claim 1 wherein each of said blends of lamp phosphors comprise a quad-phosphor blend.

3. A fluorescent lamp according to claim 2 wherein another one of said blends of lamp phosphors comprises alkaline earth metal halophosphate phosphors.

4. A fluorescent lamp according to claim 2 wherein substantial portion of said ultraviolet radiation is converted to visible illumination by said metameric mixture.

5. A fluorescent lamp according to claim 2 wherein said visible illumination has color coordinates substantially on the planckian locus.

6. A fluorescent lamp according to claim 2 wherein said visible illumination has a color point from about 2700 to about 4200K.

7. A fluorescent lamp according to claim 2 wherein said quad-phosphor blend comprising a plurality of narrow band emitting phosphors.

8. A fluorescent lamp according to claim 2 wherein said quad-phosphor blend comprising a red color emitting phosphor component having a visible emission spectrum principally in the 590 to 630 nm wavelength range, blue color emitting phosphor component having an emission spectrum principally in the 430 to 490 nm wavelength range, a green color emitting phosphor component having an emission spectrum principally in the 500 to 570 nm wavelength range, and an additional phosphor having a visible emission spectrum.

9. A fluorescent lamp according to claim 2 wherein said additional phosphor comprises a red or green emitting phosphor component.

10. A fluorescent lamp according to claim 2 wherein said quad-blend and said blend of alkaline earth metal halophosphate phosphors substantially match a desired predetermined color point.

11. A fluorescent lamp according to claim 1 wherein said metameric blends comprise a blend of said alkaline earth metal halophosphate phosphors and said quad-phosphor blend.

12. A fluorescent lamp according to claim 1 comprising a glass envelope having electrodes at its ends, a mercury and inert gas filling within said envelope for producing ultraviolet radiation, said metameric blends of lamp phosphors being on the surface of the glass envelope for converting a substantial portion of said ultraviolet radiation to visible illumination.

13. A fluorescent lamp according to claim 12 wherein said metameric mixture comprises a blend of alkaline earth metal halophosphate phosphors and a quad-phosphor blend.

14. A fluorescent lamp according to claim 13 wherein said metameric mixture is a coating on the interior surface of the glass envelope.

15. A fluorescent lamp according to claim 13 wherein said layer of said blend of alkaline earth metal halophosphate phosphor is on the interior surface of the glass envelope and said quad blend is a separate layer.

16. A fluorescent lamp according to claim 15 wherein said layer of said quad blend is a layer directly adjacent said layer of said blend of alkaline earth metal halophosphate phosphor.

17. A fluorescent lamp according to claim 13 wherein said visible light has predetermined x and y values of ICI coordinates wherein the x value is in the range of 0.35 to 0.45, and said y value is in the range of 0.375 to 0.425.

18. A fluorescent lamp according to claim 13 wherein the amount of said quad-phosphor blend is from about 10 percent and 50 weight percent of the total combined phosphor weight of said first and said second phosphor layers.

19. A fluorescent lamp according to claim 18 wherein said green emitting phosphor is a zinc orthosilicate phosphor.

20. A fluorescent lamp according to claim 19 wherein said blue color emitting phosphor is narrow band emitting phosphor.

21. A fluorescent lamp according to claim 20 wherein said blue emitting phosphors are selected from the group consisting of europium activated barium magnesium aluminate, europium activated strontium cholorophosphate, and europium activated strontium barium calcium chlorophosphate.

22. A fluorescent lamp according to claim 21 wherein said blue emitting phosphor has the formula $BaMg_2Al_{16}O_{27}:Eu^+_2$.

23. A fluorescent lamp according to claim 22 wherein said first phosphor component is a red color emitting phosphor activated by trivalent europium.

24. A fluorescent lamp according to claim 23 wherein said red emitting phosphor is europium activated gadolinium oxide ($Gd_2O_3:E^{+3}$) or europium activated yttrium oxide ($Y_2O_3:E^{+3}$) or mixtures thereof.

25. A fluorescent lamp according to claim 24 wherein said yttrium oxide activated by trivalent europium has a peak emission at 611 nm.

26. A fluorescent lamp according to claim 12 wherein said phosphor coating comprises a dual layer comprising a first layer of said blend of alkaline earth metal halophosphate phosphors deposited on the inner glass surface and a second layer of said quad-phosphor blend deposited directly on said first phosphor layer.

27. A fluorescent lamp according to claim 26 wherein second layer comprises a four component blend of phosphors of sufficient thickness for converting a substantial portion of the ultraviolet radiation to visible illumination having a white color.

28. A fluorescent lamp according to claim 26 wherein said first layer comprises a finely divided fluorescent calcium haloapatite phosphor exhibiting the desired white color point.

* * * * *